United States Patent
Matsumoto et al.

(10) Patent No.: US 12,308,599 B2
(45) Date of Patent: May 20, 2025

(54) OPTICAL AMPLIFIER, OPTICAL AMPLIFIER EQUALIZING METHOD, AND TRANSMISSION SYSTEM

(71) Applicant: NEC Corporation, Tokyo (JP)

(72) Inventors: Keiichi Matsumoto, Tokyo (JP); Emmanuel Le Taillandier De Gabory, Tokyo (JP); Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 997 days.

(21) Appl. No.: 17/413,628

(22) PCT Filed: Dec. 19, 2019

(86) PCT No.: PCT/JP2019/049875
§ 371 (c)(1),
(2) Date: Jun. 14, 2021

(87) PCT Pub. No.: WO2020/137820
PCT Pub. Date: Jul. 2, 2020

(65) Prior Publication Data
US 2022/0045473 A1 Feb. 10, 2022

(30) Foreign Application Priority Data
Dec. 27, 2018 (JP) .................. 2018-243894

(51) Int. Cl.
*H01S 3/067* (2006.01)
*H01S 3/091* (2006.01)
(Continued)

(52) U.S. Cl.
CPC ...... *H01S 3/06737* (2013.01); *H01S 3/06754* (2013.01); *H01S 3/0912* (2013.01);
(Continued)

(58) Field of Classification Search
None
See application file for complete search history.

(56) References Cited

U.S. PATENT DOCUMENTS

| | | | |
|---|---|---|---|
| 6,055,092 A | 4/2000 | Sugaya et al. | |
| 2014/0022627 A1* | 1/2014 | Takushima | G02B 6/262 359/341.3 |

(Continued)

FOREIGN PATENT DOCUMENTS

| | | |
|---|---|---|
| JP | H04147114 A | 5/1992 |
| JP | H08248455 A | 9/1996 |

(Continued)

OTHER PUBLICATIONS

Castro et al., "100-Gb/s Transmission Over a 2520-km Integrated MCF System Using Cladding-Pumped Amplifiers" IEEE Photonics Technology Letters, vol. 29, No. 14, pp. 1187-1190. (Year: 2017).*

(Continued)

*Primary Examiner* — Eric L Bolda
(74) *Attorney, Agent, or Firm* — Sughrue Mion, PLLC

(57) ABSTRACT

The optical amplifier, which amplifies wavelength multiplexed signal light, comprises: a multi-core optical fiber which includes cladding and a first core and a second core disposed in the cladding, and which is doped with rare-earth ions; an excitation light source for supplying excitation light to the cladding of the multi-core optical fiber; and a wavelength demultiplexing means for separating the wavelength bands of the wavelength multiplexed signal light that has propagated through the first core. The signal light of a relatively long wavelength band among a plurality of wavelength bands separated by the wavelength demultiplexing means is caused to propagate through the second core, and is then multiplexed with the signal light of a relatively short wavelength band among the plurality of wavelength bands separated by the wavelength demultiplexing means, and the resultant multiplexed signal light is output.

20 Claims, 9 Drawing Sheets

(51) Int. Cl.
*H01S 3/094* (2006.01)
*H04B 10/294* (2013.01)
*H04J 14/00* (2006.01)
*H04J 14/02* (2006.01)

(52) U.S. Cl.
CPC .. *H01S 3/094007* (2013.01); *H01S 3/094096* (2013.01); *H04B 10/294* (2013.01); *H04J 14/02216* (2023.08); *H04J 14/052* (2023.08)

(56) References Cited

U.S. PATENT DOCUMENTS

| | | | |
|---|---|---|---|
| 2015/0086199 A1* | 3/2015 | Ryf | H01S 3/06737 359/341.1 |
| 2021/0028590 A1* | 1/2021 | Le Taillandier De Gabory | H01S 3/06754 |
| 2021/0044077 A1* | 2/2021 | Le Taillandier De Gabory | H01S 3/1304 |
| 2021/0359485 A1* | 11/2021 | Nakamura | H01S 3/06754 |

FOREIGN PATENT DOCUMENTS

| | | |
|---|---|---|
| JP | 2002341390 A | 11/2002 |
| JP | 2005215413 A | 8/2005 |
| JP | 2006012979 A | 1/2006 |
| JP | 2015167158 A | 9/2015 |
| WO | 2018097075 A1 | 5/2018 |
| WO | 2018135621 A1 | 7/2018 |

OTHER PUBLICATIONS

International Search Report for PCT Application No. PCT/JP2019/049875, mailed on Mar. 24, 2020.
English translation of Written opinion for PCT Application No. PCT/JP2019/049875, mailed on Mar. 24, 2020.

* cited by examiner

OPTICAL AMPLIFIER, OPTICAL AMPLIFIER EQUALIZING METHOD, AND TRANSMISSION SYSTEM This application is a National Stage Entry of PCT/JP2019/049875 filed on Dec. 19, 2019, which claims priority from Japanese Patent Application 2018-243894 filed on Dec. 27, 2018, the contents of all of which are incorporated herein by reference, in their entirety.

TECHNICAL FIELD

The present invention relates to an optical amplifier, an equalizing method for the optical amplifier, and a transmission system, and more specifically to a multi-core optical fiber amplifier in an optical transmission device, an equalizing method for the amplifier, and a transmission system using the amplifier.

BACKGROUND ART

As an optical fiber amplifier that amplifies a signal intensity of an optical signal, there is an optical fiber amplifier that amplifies, by inputting pumping light being output from a pumping light source to a rare-earth doped fiber to which the optical signal is input, a signal intensity of the optical signal. For example, an optical fiber amplifier having a structure in which erbium (Er) as one example of a rare-earth element is doped in a core portion of a fiber is known.

An optical fiber amplifier used in a 1.55-µm band being a low-loss wavelength band in optical fiber communication has a structure in which erbium is doped in a core portion of a fiber, activates erbium ions in an optical fiber by using pumping light of a 0.98-µm or 1.48-µm band, and uses laser transition of a 1.55-µm band possessed by erbium, and thereby sufficiently amplifies, based on semiconductor laser-diode pumping, signal light of a 1.55-µm band.

An optical fiber amplifier features high efficiency and high gain and has a gain being substantially polarization-independent, and therefore is used as an optical signal-relay amplifier for an optical fiber communication system. In the optical fiber communication system, a wavelength division multiplexing (WDM) transmission technique for multiplexing a plurality of wavelengths in order to enable large-capacity communication is employed, and an amplifier collectively amplifies all channels. However, in an optical fiber transmission-relay system that transmits wavelength multiplexed signal light (hereinafter, referred to as WDM signal light), a gain of an optical amplifier is different for each wavelength, and therefore a difference occurs between wavelengths in an intensity of an optical signal. Therefore, an optical-gain equalizing filter for decreasing a gain deviation of an optical signal is included, and when a gain deviation is generated in output of an optical relay, the gain deviation generated in the optical amplifier is equalized by the gain equalizing filter and an adjustment is made to a state where excellent transmission quality is acquired.

Patent Literature 1 (PTL1) relates to an equalizing method for an optical level and proposes that an optical level imbalanced due to a fact that wavelength characteristics of a gain of an optical amplifier are not flat is equalized. Patent Literature 2 (PTL2) relates to an optical transmission system based on a wavelength multiplexing method and describes that, in order to decrease a gain deviation of an optical amplifier, an optical gain equalizer including an optical-gain equalizing filter is used.

In recent years, a space division multiplexing (SDM) transmission technique has been examined in order to enable larger-capacity communication, and transmission using a multi-core optical fiber including a plurality of cores in one clad is being studied. In the SDM transmission technique, it is being examined that signal light propagating through each core of a multi-core optical fiber is amplified by a core-individual pumping method in which pumping light is supplied for each core or by a clad-collective pumping method in which pumping light is caused to enter a clad in a periphery of a core and pumping light is collectively supplied to all cores. However, in both methods, a gain deviation is generated in WDM signal light propagating through each core, and therefore the gain deviation is equalized by using an each-core-individual or all-core-collective gain equalizing filter and an adjustment is made to a state where excellent transmission quality is acquired. Patent Literature 3 (PTL3), for example, relates to a multi-core optical fiber amplifier and proposes a multi-core optical fiber amplifier based on the above-described core-individual pumping method and a multi-core optical fiber amplifier based on the above-described clad-collective pumping method.

CITATION LIST

Patent Literature

[PTL1] Japanese Patent Application Laid-Open No. H04-147114
[PTL2] Japanese Patent Application Laid-Open No. 2005-215413
[PTL3] Japanese Patent Application Laid-Open No. 2015-167158

SUMMARY OF INVENTION

Technical Problem

As a configuration example of such an optical amplifier, a configuration illustrated in FIG. 9 is conceivable. In an optical amplifier in FIG. 9, single-core optical fibers 1011a to 101Na propagate optical signals IN1 to INN to be input, and single-core optical fibers 1011b to 101Nb propagate optical signals OUT1 to OUTN to be output. Optical isolators 1021a to 102Na and 1021b to 102Nb limit a propagation direction of signal light to one direction, and an optical multiplexer 1003 for pumping signal light synthesizes output of a pumping light source 1005 with a multi-core optical fiber doped with erbium (hereinafter, referred to as a "multi-core erbium-doped fiber 1004"). A light-source drive circuit 1006 drives the pumping light source 1005, and optical-gain equalizing filters 1071 to 107N equalize a gain deviation generated in the optical amplifier. A fan-out device 1008a couples WDM signal light in N spaces propagating through the single-core optical fibers 1011a to 101Na having one core in one clad with the multi-core erbium-doped fiber 1004 having N cores in one clad. A fan-in device 1008b couples WDM signal light propagating through the multi-core erbium-doped fiber 1004 having N cores in one clad with the single-core optical fibers 1011b to 101Nb having one core in one clad.

As the optical multiplexer 1003, generally, a 0.98-µm/1.55-µm or 1.48-µm/1.55-µm wavelength-multiplexing directional coupler is used and is designed in such a way as to be able to efficiently guide pumping light of a 0.98-µm or 1.48-µm band and signal light of a 1.55-µm band to one fiber.

A configuration is made in such a way that pumping light is propagated in the same propagation direction as signal light or in a direction opposite to signal light, and energy is provided. In this manner, a similar amplification effect can be achieved both when a configuration is made in such a way that a propagation direction of signal light and a propagation direction of pumping light are the same and when a configuration is made in such a way that both directions are opposite to each other. The former configuration is referred to as forward pumping and the latter configuration is referred to as backward pumping. An amplification direction of the multi-core erbium-doped fiber 1004 has reversibility, and therefore by using the optical isolators 1021a to 102Na and 1021b to 102Nb, a propagation direction of an optical signal is limited, whereby oscillation of the optical amplifier due to multiple reflection is prevented.

Optical signals IN1 to INN of a 1.55-nm band being input to the optical amplifier in FIG. 9 are passed, during propagation through the single-core optical fibers 1011a to 101Na, through the optical isolators 1021a to 102Na, the fan-out device 1008a, and the optical multiplexer 1003, and guided to the multi-core erbium-doped fiber 1004. The pumping light source 1005 supplies, in order to amplify the optical signals IN1 to INN passing through the multi-core erbium-doped fiber 1004, pumping light power to the multi-core erbium-doped fiber 1004, and thereby amplifies the optical signals IN1 to INN.

Amplified optical signals are guided, via the fan-in device 1008b and the optical isolators 1021b to 102Nb, to the optical-gain equalizing filters 1071 to 107N from the single-core optical fibers 1011b to 101Nb and output as OUT1 to OUTN after a gain deviation generated in the optical amplifier is equalized.

However, with regard to equalization of a gain deviation of WDM signal light, a channel having a high gain level is attenuated according to a channel having a low gain level, and therefore, when a gain deviation is large and an attenuation request level is high, pumping light energy having amplified the channel having a high gain level does not substantially contribute to optical amplification. Therefore, electric-power utilization efficiency of the optical amplifier decreases. This situation becomes a bottleneck with respect to an increase in transmission capacity in recent years in which, in order to expand a node throughput in limited power resources, low power consumption of the optical amplifier is required.

In view of the above-described problems, an object of the present invention is to provide an optical amplifier, an equalizing method for the optical amplifier, and a transmission system that have high electric-power utilization efficiency by reducing, when an optical signal to be transmitted is amplified, an inter-wavelength gain variation and lowering an attenuation request level.

Solution to Problem

In order to achieve the object, an optical amplifier according to the present invention is an optical amplifier that amplifies wavelength multiplexed signal light, the optical amplifier including:
- a multi-core optical fiber that includes a clad, and a first core and a second core being disposed in the clad and is doped with rare-earth ions;
- a pumping light source that supplies pumping light to the clad of the multi-core optical fiber; and
- a wavelength demultiplexing means that separates a wavelength band of the wavelength multiplexed signal light propagating through the first core, wherein
- signal light of a relatively long wavelength band among a plurality of wavelength bands separated by the wavelength demultiplexing means is caused to propagate through the second core and then multiplexed with signal light of a relatively short wavelength band among the plurality of wavelength bands separated by the wavelength demultiplexing means, and the resultant multiplexed signal light is output.

A transmission system according to the present invention includes: an optical fiber; and the optical amplifier connected to the optical fiber.

An equalizing method for an optical amplifier according to the present invention is an equalizing method for an optical amplifier that amplifies wavelength multiplexed signal light, wherein
the optical amplifier includes a multi-core optical fiber that includes a clad, and a first core and a second core being disposed in the clad, and is doped with rare-earth ions, a pumping light source that supplies pumping light to the clad of the multi-core optical fiber, and a wavelength demultiplexing means that separates a wavelength band of the wavelength multiplexed signal light propagating through the first core,
the method including: causing signal light of a relatively long wavelength band among a plurality of wavelength bands separated by the wavelength demultiplexing means to propagate through the second core; multiplexing the propagated signal light with signal light of a relatively short wavelength band among the plurality of wavelength bands separated by the wavelength demultiplexing means; and outputting the resultant multiplexed signal light.

Advantageous Effects of Invention

According to the present invention, when an optical signal to be transmitted is amplified, an inter-wavelength gain variation is reduced and an attenuation request level is lowered, and thereby an optical amplifier, an equalizing method for the optical amplifier, and a transmission system that have high electric-power utilization efficiency can be provided.

EXAMPLE EMBODIMENT (Outline of Example Embodiment)

An optical fiber amplifier according to an example embodiment of the present invention is, for example, an optical fiber amplifier having a core number of M (M≥2N) including a multi-core optical fiber being doped with rare-earth ions that amplify an optical signal by being supplied with pumping light, and being optimized in length for short wavelength side amplification, and a light source that generates the pumping light. The optical fiber amplifier inputs WDM signal light propagating through an MCF having a core number of N (N≥1) to cores of the optical fiber amplifier, separates a wavelength band, and executes, once or more, re-pumping of a long wavelength band having a low gain level by using different cores.

When a gain level of WDM signal light propagating through a multi-core optical fiber is equalized between wavelengths, an attenuation request level is lowered. As a result, pumping light energy that does not contribute to optical amplification can be reduced, and broadband and low-power consumption optical amplification is made possible. Amplification using the same medium based on clad-collective pumping is employed, and therefore the above-described action can be achieved with small number of components.

Figure 1:
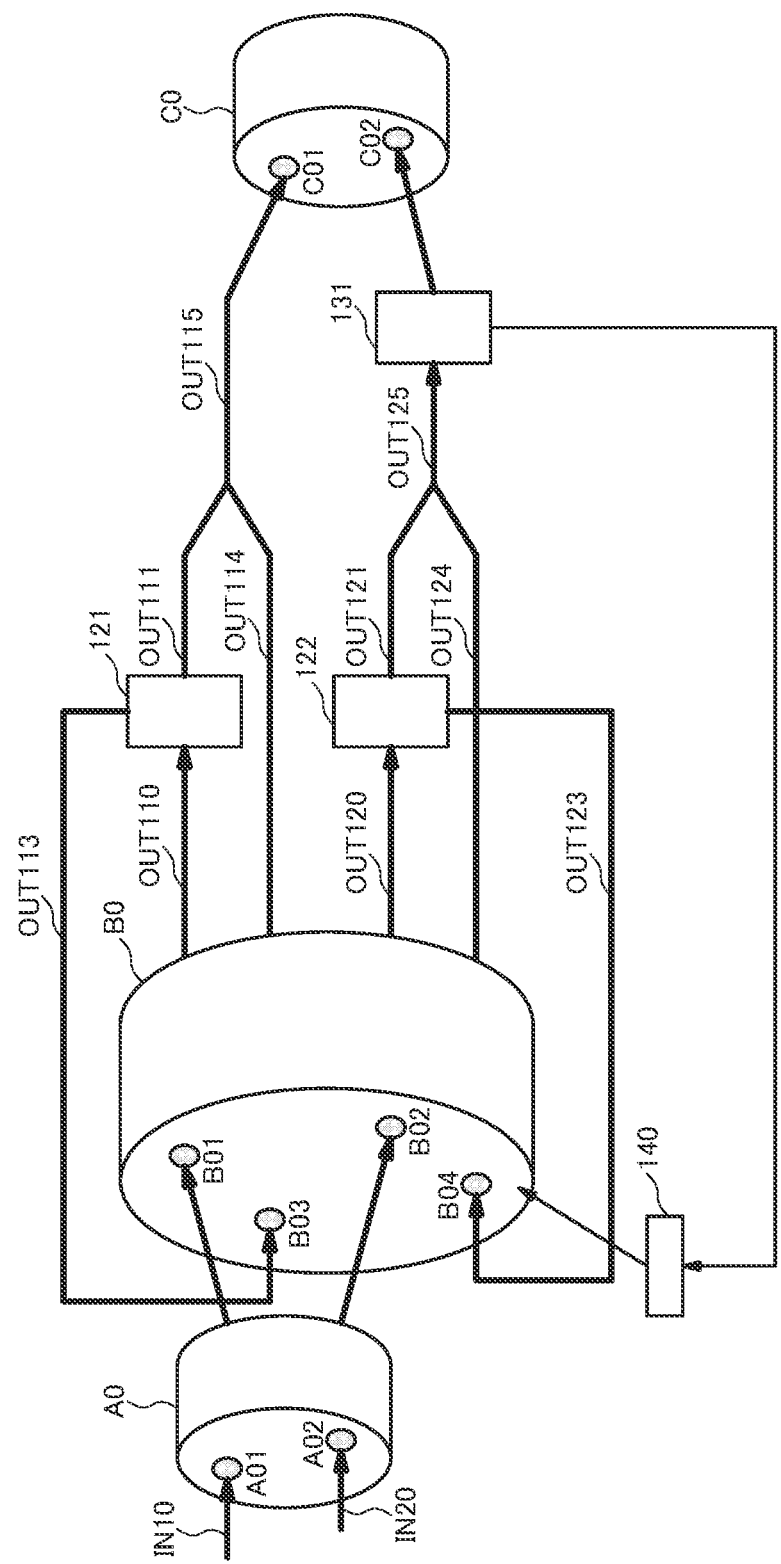
FIG. 1 is a block diagram for illustrating a configuration example of an optical amplifier according to an example embodiment of a generic concept.

Before an optical amplifier, an equalizing method for an optical amplifier, and a transmission system are described more specifically, an optical amplifier according to an example embodiment of a generic concept is described. FIG. 1 is a block diagram for illustrating a configuration example of an optical amplifier according to an example embodiment of a generic concept.

The optical amplifier in FIG. 1 is configured in such a way as to amplify, by using an optical fiber amplifier having a core number of 4, WDM signal light propagating through a multi-core optical fiber having a core number of 2. The optical amplifier in FIG. 1 includes a multi-core optical fiber A0, a multi-core optical fiber B0 doped with rare-earth ions, and a multi-core optical fiber C0. The optical amplifier in FIG. 1 further includes wavelength demultiplexers 121 and 122, an optical branching device 131, and a pumping light source 140.

The multi-core optical fiber A0 propagates optical signals IN10 and IN20 to be input. The multi-core optical fiber B0 is a multi-core fiber that includes a plurality of cores and a clad, these cores being doped with erbium ions as one example of rare-earth ions and amplifies an optical signal through introduction of pumping light. The multi-core optical fiber C0 propagates optical signals OUT115 and OUT125 to be output. The wavelength demultiplexers 121 and 122 demultiplex WDM signal light from the multi-core optical fiber B0 into a short wavelength side and a long wavelength side. The optical branching device 131 separates a part of the optical signal OUT125. In other words, the optical branching device 131 branches a part of WDM signal light (branches a part while including a signal of each wavelength band of WDM signal light). The pumping light source 140 is, for example, a light source of an output wavelength of 980 nm or 1480 nm and is used for a clad pumping method in which pumping light output by the light source is introduced into the clad of the multi-core optical fiber B0 and the plurality of cores are optically pumped collectively.

In the optical amplifier in FIG. 1, cores A01 and A02 of the multi-core optical fiber A0 are connected to cores B01 and B02 of the multi-core optical fiber B0 via a fan-out device and an optical isolator, which are not illustrated. Outputs of the cores B01 and B02 of the multi-core optical fiber B0 are connected to inputs of the wavelength demultiplexers 121 and 122, respectively. Among outputs of the wavelength demultiplexers 121 and 122, outputs of a long wavelength band having a low gain level in the multi-core optical fiber B0 are connected to cores B03 and B04 of the multi-core optical fiber B0, respectively.

Among outputs of the wavelength demultiplexers 121 and 122, optical signals OUT111 and OUT121 being outputs of a short wavelength band having a high gain level in the multi-core optical fiber B0 are multiplexed with outputs, i.e., optical signal OUT114 and OUT 124 of the cores B03 and B04 of the multi-core optical fiber B0 and formed as optical signals OUT115 and OUT125. The optical signal OUT115 is connected to a core C01 of a multi-core fiber C0 via a fan-in device and an optical isolator, which are not illustrated, and the optical signal OUT125 is connected to a core C02 of the multi-core optical fiber C0 via the optical branching device 131, and a fan-in device and an optical isolator, which are not illustrated. Output of the optical branching device 131 is also used for controlling clad-collective pumping based on the pumping light source 140.

In the optical amplifier in FIG. 1 configured in this manner, optical signals IN10 and IN20 output from the cores A01 and A02 of the multi-core optical fiber A0 are input to the cores B01 and B02 of the multi-core optical fiber B0 via a fan-out device and an optical isolator. The optical signals IN10 and IN20 are supplied, in the cores B01 and B02 of the multi-core optical fiber B0, with pumping light power by a clad-collective pumping method from the pumping light source 140, thereby amplified, and output as amplified optical signals OUT110 and OUT120. At that time, the optical signals OUT110 and OUT120 are demultiplexed in the wavelength demultiplexers 121 and 122 into optical signals OUT111 and OUT121 of a short wavelength band having a high gain level and optical signals OUT113 and OUT123 of a long wavelength band having a low gain level.

The optical signals OUT113 and OUT123 of a long wavelength band having a low gain level are supplied again, in the cores B03 and B04 of the multi-core optical fiber B0, with pumping light power by a clad-collective pumping method from the pumping light source 140, thereby amplified, and output as amplified optical signals OUT114 and OUT124.

The optical signals OUT111 and OUT121 and the optical signals OUT114 and OUT124 are multiplexed, respectively, and propagated, as WDM signal light OUT115 and OUT125, to the cores C01 and C02 of the multi-core optical fiber C0. Herein, the WDM signal light OUT125 is propagated to the core C02 of the multi-core optical fiber C0 via the optical branching device 131.

At that time, a part of the optical signal OUT125 is branched in the optical branching device 131, converted to an electric signal in a photoelectric conversion means illustration of which is omitted, and used, as output level information of signal light, for controlling clad-collective pumping based on the pumping light source 140. When a signal-light output level of a channel being a lowest gain level is high compared with an allowable threshold of a signal-light output level, the pumping light source 140 is controlled in such a way as to weaken clad-collective pumping output. When a signal-light output level of a channel being a lowest gain level is low compared with an allowable threshold of a signal-light output level, the pumping light source 140 is controlled in such a way as to strengthen clad-collective pumping output.

According to the optical amplifier in FIG. 1, optical signals OUT113 and OUT123 of a long wavelength band having a low gain level are supplied again, in the cores B03 and B04 of the multi-core optical fiber B0 doped with rare-earth ions, with pumping light power by a clad-collective pumping method from the pumping light source 140, thereby amplified, and additionally supplied with pumping energy, whereby a high gain can be acquired. Thereby, a gain level of WDM signal light is equalized in a band, and thereby an attenuation request level can be lowered. As a result, electric-power utilization efficiency of the amplifier is increased, and thereby broadband and low-power consumption optical amplification is made possible.

Hereinafter, preferred example embodiments according to the present invention are described in detail with reference to drawings. In the following description, it is assumed that by using an optical amplifier having a core number of M, WDM signal light propagating through a multi-core fiber having a core number of N (N≥1, 2N≤M) is amplified.

First Example Embodiment

Figure 2:
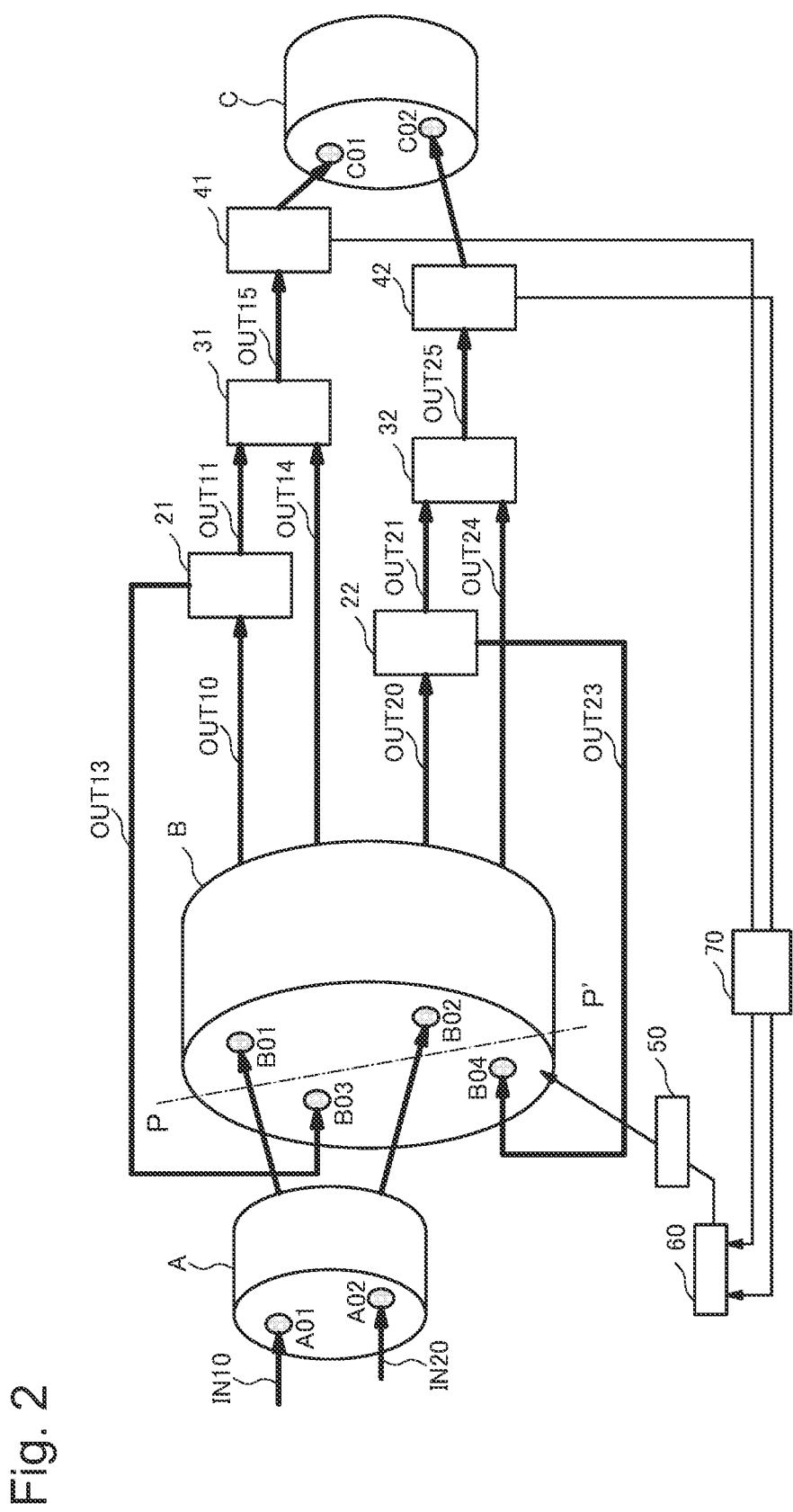
FIG. 2 is a block diagram illustrating a configuration example of an optical amplifier according to a first example embodiment.

An optical amplifier and an equalizing method for an optical amplifier according to a first example embodiment of the present invention are described. FIG. 2 is a block diagram illustrating a configuration example of the optical amplifier according to the first example embodiment of the present invention. While according to the present example embodiment, a configuration in which WDM signal light propagating through a multi-core fiber having a core number of 2 is amplified by using an optical amplifier having a core number of 4 is described as one example, the present invention is not limited to the numbers.

An optical amplifier in FIG. 2 includes a multi-core optical fiber A, a multi-core erbium-doped optical fiber B, and a multi-core optical fiber C. The optical amplifier in FIG. 2 further includes wavelength demultiplexers 21 and 22, wavelength multiplexers 31 and 32, optical branching devices 41 and 42, a pumping light source 50, a light-source drive circuit 60, and a light-source-drive-circuit control device 70.

The multi-core optical fiber A propagates optical signals IN10 and IN20 to be input. The multi-core erbium-doped optical fiber B is a multi-core optical fiber that includes a plurality of cores and a clad, these cores being doped with erbium ions as one example of a rare-earth element and amplifies an optical signal by being supplied with pumping light. Herein, it is assumed that the multi-core erbium-doped optical fiber B according to the present example embodiment is optimized in length for short wavelength-side amplification. The multi-core optical fiber C propagates optical signals OUT15 and OUT25 to be output.

The wavelength demultiplexers 21 and 22 separate an optical signal by each wavelength band, executes wavelength-multiplexing/space-multiplexing conversion, and demultiplex WDM signal light from the multi-core erbium-doped optical fiber B into a short wavelength side and a long wavelength side.

The wavelength multiplexers 31 and 32 synthesize optical signals by each wavelength band, executes space-multiplexing/wavelength-multiplexing conversion, and multiplex a short wavelength side and a long wavelength side of WDM signal light. In other words, the wavelength multiplexer 31 multiplexes an optical signal OUT11 from the wavelength demultiplexer 21 with an optical signal OUT14 from a core B03, and the wavelength multiplexer 32 multiplexes an optical signal OUT21 from the wavelength demultiplexer 22 with an optical signal OUT24 from a core B04.

The optical branching devices 41 and 42 separate parts of signal light from the wavelength multiplexers 31 and 32, respectively. In other words, the optical branching devices 41 and 42 each branch a part of WDM signal light (branch a part while including a signal of each wavelength band of WDM signal light). The pumping light source 50 is a light source for pumping light of a pumping-light wavelength 980-nm band or a light source for pumping light of a pumping-light wavelength 1480-nm band, and pumping light is introduced into a clad of the multi-core erbium-doped optical fiber B. In FIG. 2, pumping light from the pumping light source 50 is introduced into the clad of the multi-core erbium-doped optical fiber B in a form of forward pumping. The light-source drive circuit 60 drives the pumping light source 50. The light-source-drive-circuit control device 70 controls, based on output level information of signal light, the light-source drive circuit 60, and output level information of signal light is provided by converting an optical output being output by each of the optical branching devices 41 and 42 into an electric signal by using a photoelectric conversion means illustration of which is omitted.

Figure 9:
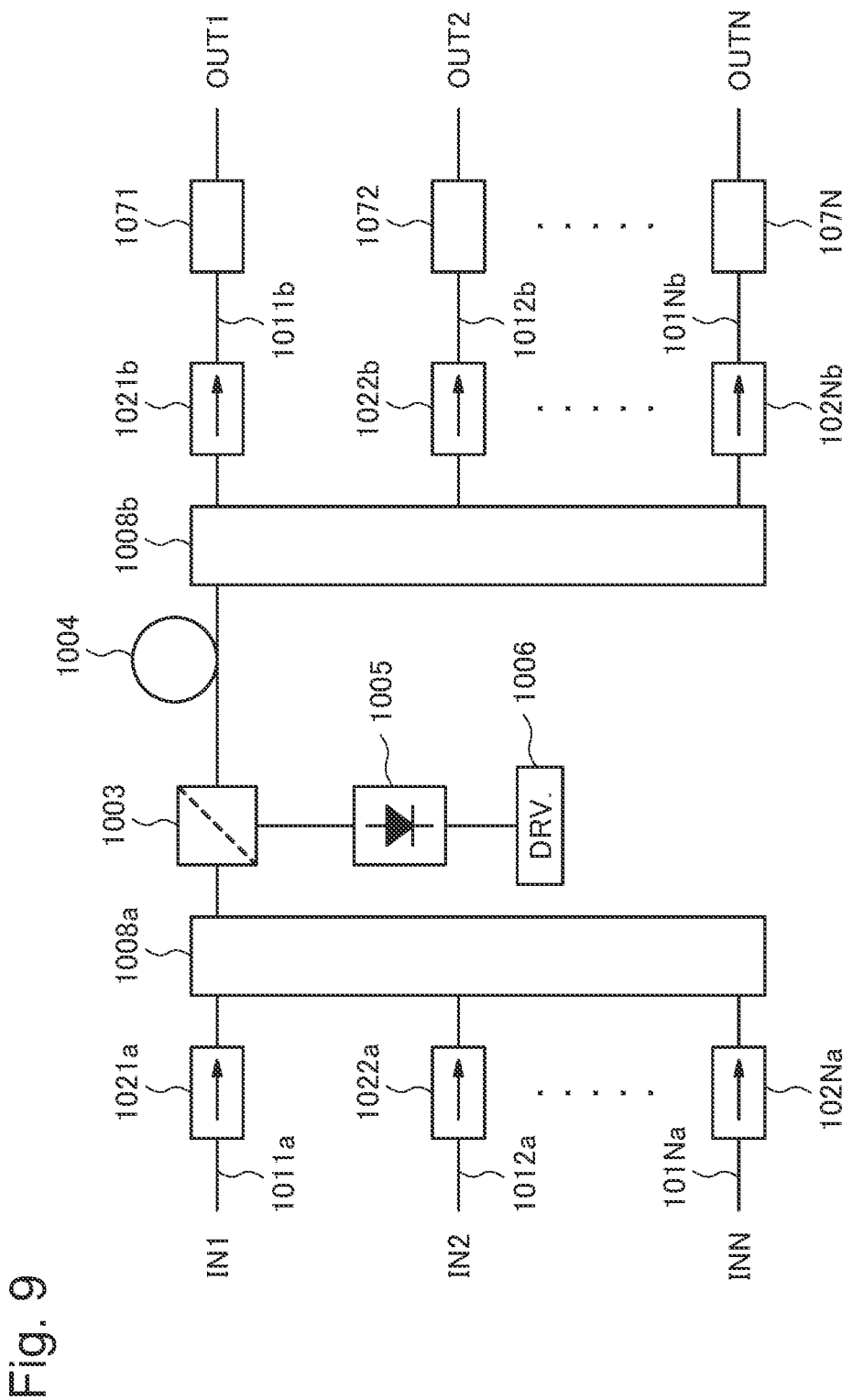
FIG. 9 is a schematic diagram illustrating an example of an optical amplifier used in a transmission system.

In the optical amplifier in FIG. 2, cores A01 and A02 of the multi-core optical fiber A are connected to cores B01 and B02 of the multi-core erbium-doped optical fiber B via a fan-out device and an optical isolator, which are not illustrated. The fan-out device and the optical isolator are equivalent to a fan-out device 1008a and optical isolators 1021a to 102Na in the optical amplifier in FIG. 9. Outputs of the cores B01 and B02 of the multi-core erbium-doped optical fiber B are connected to inputs of the wavelength demultiplexers 121 and 122, respectively. Among outputs of the wavelength demultiplexers 21 and 22, outputs of a long wavelength band in which a gain level in the multi-core erbium-doped optical fiber B is low are connected to cores B03 and B04 of the multi-core erbium-doped optical fiber B, respectively. Among outputs of the wavelength demultiplexers 21 and 22, outputs of a short wavelength band in which a gain level in the multi-core erbium-doped optical fiber B is high are connected to inputs of the wavelength multiplexers 31 and 32, respectively. Outputs of the cores B03 and B04 of the multi-core erbium-doped optical fiber B are also connected to inputs of the wavelength multiplexers 31 and 32.

Outputs of the wavelength multiplexers 31 and 32 are connected to inputs of the optical branching devices 41 and 42. Outputs of the optical branching devices 41 and 42 are connected to cores C01 and C02 of the multi-core optical fiber C via a fan-in device and an optical isolator, which are not illustrated. The fan-in device and the optical isolator are equivalent to a fan-in device 1008b and optical isolators 1021b to 1-2Nb in an optical amplifier in FIG. 8.

Outputs of the optical branching devices 41 and 42 are connected to inputs of the light-source-drive-circuit control device 70. Outputs of the light-source-drive-circuit control device 70 are connected to inputs of the light-source drive circuit 60. An output from the pumping light source 50 is supplied to the clad of the multi-core erbium-doped optical fiber B in a form of clad-collective pumping via an optical multiplexer.

In the optical amplifier in FIG. 2 configured in this manner, optical signals IN10 and IN20 of a 1.55-μm band output from the cores A01 and A02 of the multi-core optical fiber A are input to the cores B01 and B02 of the multi-core erbium-doped optical fiber B via the fan-out device and the optical isolator. The optical signal IN10 and IN20 are supplied, in the cores B01 and B02 of the multi-core erbium-doped optical fiber B, with pumping light power by a clad-collective pumping method from the pumping light source 50, thereby amplified, and output as amplified optical signals OUT10 and OUT20. At that time, the optical signals OUT10 and OUT20 are demultiplexed in the wavelength demultiplexers 21 and 22 into optical signals OUT11 and OUT21 of a short wavelength band having a high gain level and optical signals OUT13 and OUT23 of a long wavelength band having a low gain level.

The optical signals OUT13 and OUT23 of a long wavelength band having a low gain level are supplied again, in the cores B03 and B04 of the multi-core erbium-doped optical fiber B, with pumping light power by a clad-collective pumping method from the pumping light source 50, thereby amplified, and output as amplified optical signals OUT14 and OUT24.

The optical signals OUT11 and OUT21 and the optical signals OUT14 and OUT24 are multiplexed by the wavelength multiplexers 31 and 32, respectively, and propagated, as WDM signal light OUT15 and OUT25, to the cores C01 and C02 of the multi-core optical fiber C.

At that time, parts of the optical signals OUT15 and OUT25 are branched in the optical branching devices 41 and 42, converted to electric signals by photoelectric conversion means illustration of which is omitted, and transmitted to the light-source-drive-circuit control device 70 as output level information of signal light. The light-source-drive-circuit control device 70 stores an allowable threshold of a signal-light output level. The light-source-drive-circuit control device 70 transmits, to the light-source drive circuit 60, an instruction to weaken clad-collective pumping output when a signal-light output level of a channel at a lowest gain level is higher than the allowable threshold and to strengthen clad-collective pumping output when a signal-light output level of a channel at a lowest gain level is lower than the allowable threshold in an entire band of WDM signal light OUT15 and OUT25.

Advantageous Effects of Example Embodiment

Figure 3:
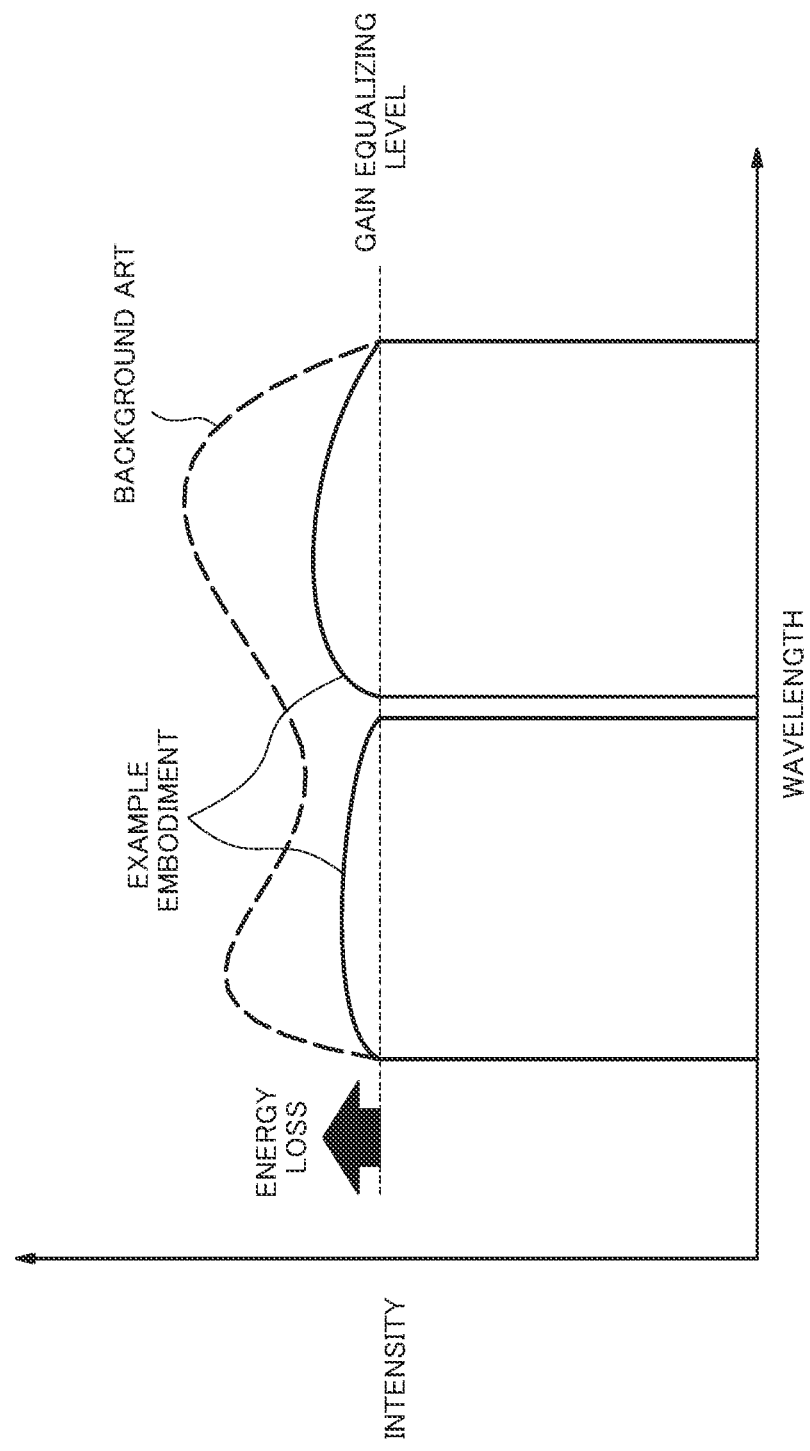
FIG. 3 is a diagram in which a situation where an attenuation request level is lowered is estimated.

FIG. 3 is a graph in which a situation where an attenuation request level is lowered is estimated. In the optical amplifier according to Background Art, pumping light energy having amplified a channel having a high gain level does not substantially contribute to optical amplification, and therefore an energy loss is large. In contrast, according to the optical amplifier of the present example embodiment, a gain level is equalized between wavelengths, and thereby an attenuation request level is lowered. In this manner, an energy loss resulting from excessive pumping is reduced, and thereby broadband amplification that achieves power consumption reduction is made possible.

According to the optical amplifier in FIG. 2, optical signals OUT13 and OUT23 of a long wavelength band having a low gain level are supplied again, in the cores B03 and B04 of the multi-core erbium-doped optical fiber B, with pumping light power by a clad-collective pumping method from the pumping light source 50, thereby amplified, and additionally supplied with pumping energy, whereby a high gain can be acquired.

A fiber length through which light of a long wavelength band having a low gain level is propagated is effectively extended, and by using a multi-core erbium-doped fiber of which length is optimized for short wavelength-side amplification, the fiber length can be optimized for long wavelength-side amplification.

Thereby, a gain level of WDM signal light is equalized in a band, and thereby an attenuation request level can be lowered. As a result, electric-power utilization efficiency of an amplifier is increased, and thereby broadband and low-power consumption optical amplification is made possible.

In the first example embodiment, a situation where WDM signal light propagating through a multi-core fiber having a core number of N is amplified by using an optical amplifier having a core number of M (N≥1, 2N≤M) is described assuming that N=2 and M=4, however, N=2, M=6, or the like may also be assumed. In this case, when an optimum effective fiber length is still not acquired even when an effective fiber length is extended, a long wavelength band having a low gain level is input again to a different core of a fiber, and thereby further extension of the effective fiber length is made possible. It is conceivable that an attenuation request level is lowered by executing clad-collective pumping again.

According to the first example embodiment, used cores may be clearly divided for each gain level, as illustrated in FIG. 2, in such a way that a line segment P-P' in the multi-core erbium-doped optical fiber B is set as a border, cores accommodating a wavelength band having a high gain are set as B01 and B02, and cores accommodating a wavelength band having a low gain are set as B03 and B04. This point is similar to a point according to example embodiments to be described later. In other words, an optical amplifier according to the example embodiments can be configured in such a way that a gain level of signal light propagating through an inside is set as a determination criterion and a plurality of cores in a clad are divided into an area where a plurality of cores accommodating a wavelength band having a low gain are disposed and an area where a plurality of cores accommodating a wavelength band having a high gain are disposed.

When used cores are divided with respect to each gain level as described above, it is conceivable that a configuration is made in such a way that a wavelength band having a high gain level is accommodated in a core for a low gain of clad-collective pumping based on a clad-collective pumping method using the pumping light source 50, and a wavelength band having a low gain level is accommodated in a core for a high gain of clad-collective pumping. A combination according to such a point of view is used, and thereby a gain level of WDM signal light can be equalized in a band. This point is similar to a point according to example embodiments to be described later.

Modified Example of First Example Embodiment

Figure 4:
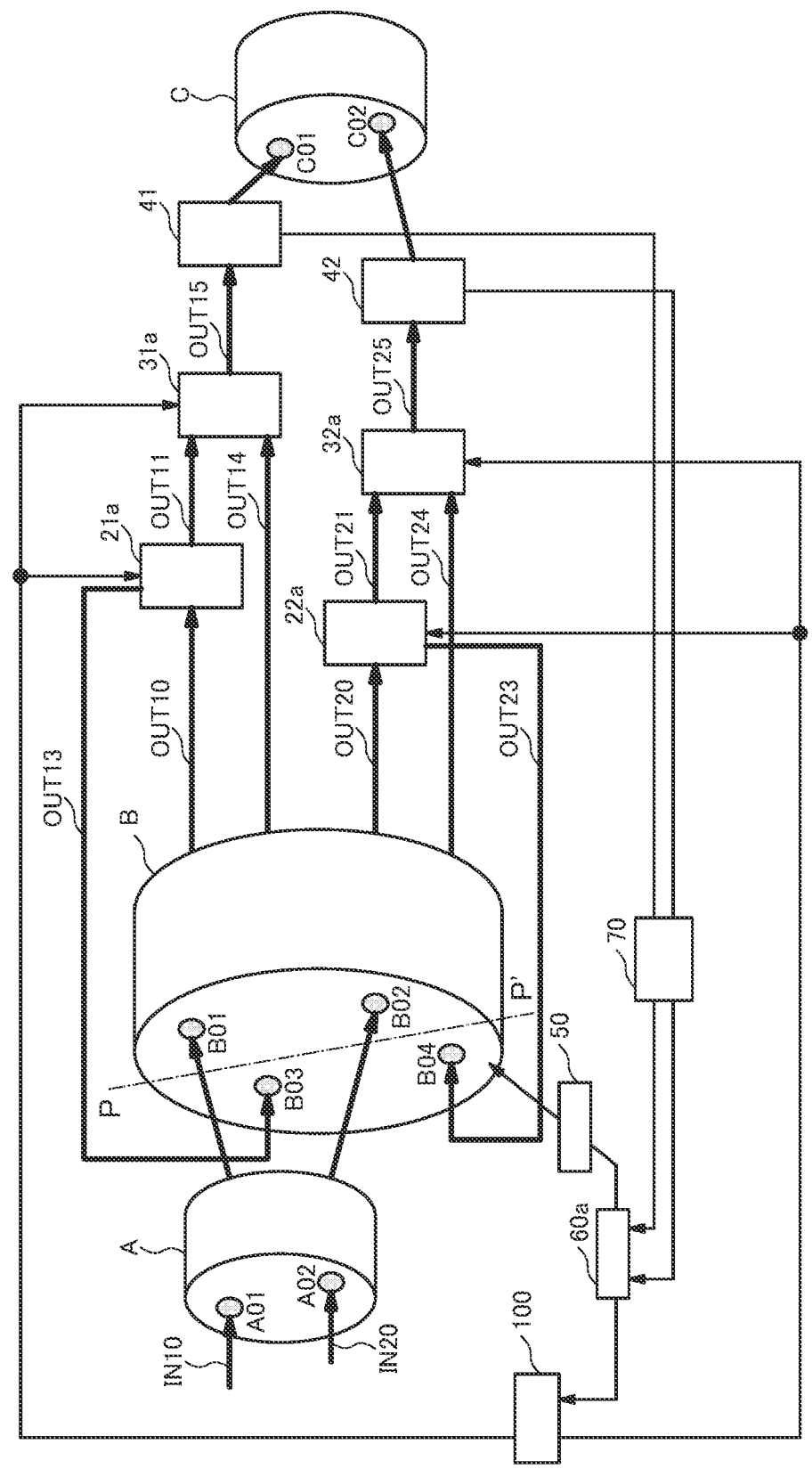
FIG. 4 is a block diagram illustrating a modified example of the optical amplifier according to the first example embodiment.

Next, a modified example of the optical amplifier according to the first example embodiment of the present invention is described. It is assumed that an element similar to an element of the optical amplifier in FIG. 2 described above is assigned with the same reference number and detailed description thereof is omitted. FIG. 4 is a block diagram illustrating a configuration example of an optical amplifier according to a modified example of the first example embodiment.

The optical amplifier in FIG. 4 includes, similarly to the optical amplifier in FIG. 2, a multi-core optical fiber A, a multi-core erbium-doped optical fiber B, and a multi-core optical fiber C. The optical amplifier in FIG. 4 further includes variable wavelength demultiplexers 21a and 22a, variable wavelength multiplexers 31a and 32a, optical branching devices 41 and 42, a pumping light source 50, a light-source drive circuit 60a, a light-source-drive-circuit control device 70, and a power consumption monitor 100.

The optical amplifier in FIG. 4 is specifically characterized by including a power consumption monitor 100, in addition to the configuration in the optical amplifier according to the first example embodiment illustrated in FIG. 2. In an an optical amplifier in FIG. 4, the wavelength demultiplexers 21 and 22 and the wavelength multiplexers 31 and 32 of the optical amplifier according to the first example embodiment illustrated in FIG. 2 are replaced with variable wavelength demultiplexers 21a and 22a and variable wavelength multiplexers 31a and 32a that can modify a ratio between a wavelength band having a high gain and a wavelength band having a low gain. The variable wavelength demultiplexer according to the present example embodiment can be achieved, for example, based on a configuration including a demultiplexer that executes demultiplexing into a wavelength band having a high gain and a wavelength band having a low gain and a variable optical attenuator (VOA) that attenuates one output of the demultiplexer in accordance with a control signal relevant to the instructed ratio.

In the optical amplifier in FIG. 4, an output of the light-source drive circuit 60a is also connected to an input of the power consumption monitor 100. An output of the power consumption monitor 100 is connected to inputs of the variable wavelength demultiplexers 21a and 22a and the variable wavelength multiplexers 31a and 32a. The power consumption monitor 100 monitors power consumption in the pumping light source 50. The power consumption monitor 100 issues, to the variable wavelength demultiplexers 21a and 22a and the variable wavelength multiplexers 31a and 32a, an instruction to adjust a ratio between a wavelength band having a high gain and a wavelength band having a low gain. More specifically, the power consumption monitor 100 issues, to the variable wavelength demultiplexers 21a and 22a and the variable wavelength multiplexers 31a and 32a, an instruction to adjust a ratio between a wavelength band having a high gain and a wavelength band having a low gain, in such a way as to decrease, preferably minimize power consumption in the pumping light source 50. By receiving the instruction, the variable wavelength demultiplexers 21a and 22a and the variable wavelength multiplexers 31a and 32a modify a ratio between a wavelength band having a high gain and a wavelength band having a low gain.

The instruction, which is issued by the power consumption monitor 100, to adjust a ratio between a wavelength band having a high gain and a wavelength band having a low gain is supplementarily described. Herein, a case in which WDM signal light propagating through a fiber having a core number of 1 is amplified by using an optical fiber amplifier having a core number of 2 is described as an example. First, based on an instruction of the power consumption monitor 100, the variable wavelength demultiplexer 21a and the variable wavelength multiplexer 31a sequentially adjust an optical power ratio between a wavelength band having a high gain and a wavelength band having a low gain. Herein, an optical power ratio instructed to the variable wavelength multiplexer 31a and an optical power ratio instructed to the variable wavelength demultiplexer 21a are the same. At that time, a WDM signal is sequentially adjusted, for example, in such a way as to be demultiplexed at ratios being a wavelength band having a high gain/a wavelength band having a low gain=0/100→25/75→50/50→75/25→100/0. As a result, a ratio of clad pumping/core pumping of pumping light output necessary for acquiring a desired gain is changed, and therefore power consumption in the pumping light source 50 is changed. At that time, the power consumption monitor 100 monitors power consumption in the pumping light source 50, and the power consumption monitor 100 fixes a ratio when a value is minimized. In this manner, an optical power ratio between a wavelength band having a high gain and a wavelength band having a low gain can be adjusted for the variable wavelength demultiplexers 21a and 22a and the variable wavelength multiplexers 31a and 32a in such a way as to decrease, preferably minimize power consumption in the pumping light source 50. It is assumed that the adjustment is executed for several seconds every time a wavelength filing rate is changed, and operated in such a way that power consumption of an amplifier is always minimum.

According to the optical amplifier in FIG. 4, similarly to the optical amplifier in FIG. 2, a gain level of WDM signal light is equalized in a band, and thereby an attenuation request level can be decreased. In the optical amplifier in FIG. 4, the variable wavelength demultiplexers 21a and 22a and the variable wavelength multiplexers 31a and 32 are instructed in such a way as to adjust a ratio between bands of a wavelength band having a high gain and a wavelength band having a low gain, in consideration of power consumption in the pumping light source 50. Thereby, while power consumption is reduced, a gain level of WDM signal light is equalized in a band, and thereby an attenuation request level can be decreased. As a result, according to the optical amplifier in FIG. 4, electric-power utilization efficiency of an optical amplifier is further increased, compared with the optical amplifier in FIG. 2, and thereby broadband and low-power consumption optical amplification is made possible.

Second Example Embodiment

Figure 5:
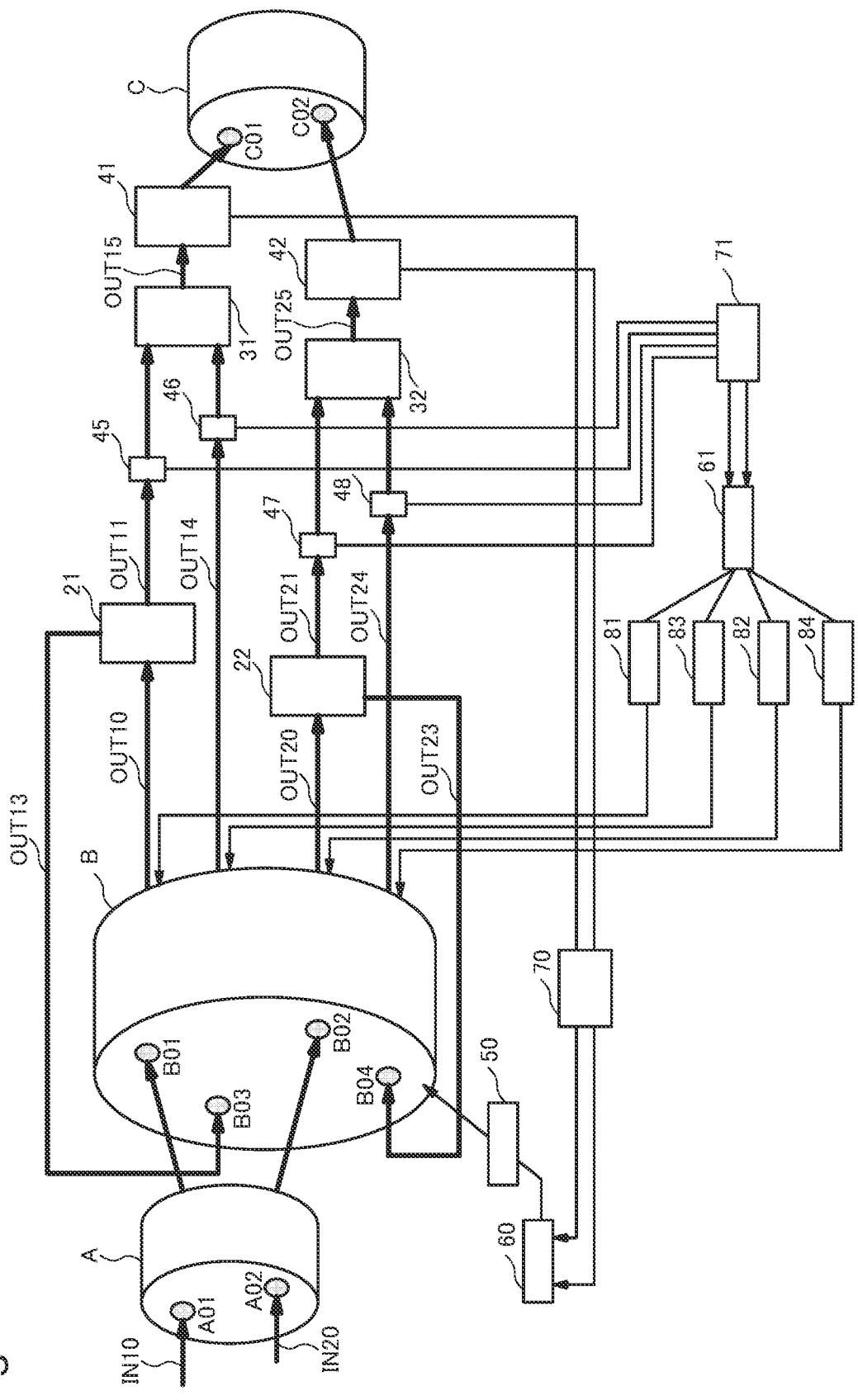
FIG. 5 is a block diagram illustrating a modified example of an optical amplifier according to a second example embodiment.

Next, an optical amplifier according to a second example embodiment of the present invention is described. FIG. 5 is a block diagram illustrating a configuration example of an optical amplifier according to the second example embodiment of the present invention. It is assumed that an element similar to an element of the above-described optical amplifier according to the first example embodiment is assigned with the same reference number, and detailed description thereof is omitted. Also, according to the present example embodiment, a configuration in which WDM signal light propagating through a multi-core fiber having a core number of 2 is amplified by using an optical fiber amplifier having a core number of 4 is described as one example, but the present invention is not limited to the numbers.

The optical amplifier in FIG. 5 includes, similarly to the optical amplifier in FIG. 2, a multi-core optical fiber A, a multi-core erbium-doped optical fiber B, and a multi-core optical fiber C. Also, according to the present example embodiment, it is assumed that a length of the multi-core erbium-doped optical fiber B is optimized for short wavelength-side amplification, similarly to the first example embodiment. The optical amplifier in FIG. 5 further includes, similarly to the optical amplifier in FIG. 2, wavelength demultiplexers 21 and 22, wavelength multiplexers 31 and 32, optical branching devices 41 and 42, a pumping light source 50, a light-source drive circuit 60, and a light-source-drive-circuit control device 70. The pumping light source 50 is a light source for pumping light of a pumping-light wavelength 980-nm band or pumping light of a pumping-light wavelength 1480-nm band. In FIG. 5, pumping light from the pumping light source 50 is introduced into a clad of the multi-core erbium-doped optical fiber B in a form of forward pumping.

The optical amplifier in FIG. 5 further includes, in addition to the configuration according to the first example embodiment, optical branching devices 45 to 48, a light-source drive circuit 61, a light-source-drive-circuit control device 71, and core-individual-pumping light sources 81 to 84. In the optical amplifier in FIG. 5, the optical branching devices 45 to 48 branch parts of optical signals OUT11, OUT14, OUT21, and OUT 24, and the branched outputs are connected to inputs of the light-source-drive-circuit control device 71. In this manner, the light-source-drive-circuit control device 71 monitors an output level of each short wavelength/long wavelength from the optical signals OUT11 and OUT14 or the optical signals OUT21 and OUT24.

Each of the core-individual-pumping light sources 81 to 84 according to the present example embodiment is a light source for pumping light of a pumping-light wavelength 980-nm band or pumping light of a pumping-light wavelength 1480-nm band and individually pumps cores B01, B02, B03, and B04 of the multi-core erbium-doped optical fiber B in a form of backward pumping. It is also conceivable that, in the optical amplifier according to the present example embodiment, a combination is made in such a way that pumping light of a pumping-light wavelength 1480-nm band is used as the pumping light source 50, and pumping light of a pumping-light wavelength 980-nm band is used as the core-individual-pumping light sources 81 to 84. It is also conceivable that, in the optical amplifier according to the present example embodiment, a combination is made in such a way that pumping light of a pumping-light wavelength 980-nm band is used as the pumping light source 50, and pumping light of a pumping-light wavelength 1480-nm band is used as the core-individual-pumping light sources 81 to 84.

The core-individual-pumping light source according to the present example embodiment are based on an idea that the cores B01, B02, B03, and B04 of the multi-core erbium-doped optical fiber B are individually pumped, and the core-individual-pumping light sources 81 to 84 of which number is the same as a core number of the multi-core erbium-doped optical fiber are provided. When a core number of the multi-core erbium-doped optical fiber B is six, six, which is the same number of, core-individual-pumping light sources may be provided. The light-source drive circuit 61 drives the core-individual-pumping light sources 81 to 84 and controls strength/weakness of core-individual pumping output of the core-individual-pumping light sources 81 to 84. The light-source-drive-circuit control device 71 controls the light-source drive circuit 61.

An output of the light-source-drive-circuit control device 71 is connected to an input of the light-source drive circuit 61. An output of the light-source drive circuit 61 is connected to inputs of the core-individual-pumping light sources 81 to 84. Output from the core-individual-pumping light sources 81 to 84 is supplied to the cores B01 to B04 of the multi-core erbium-doped optical fiber B in a form of core individual pumping via an optical multiplexer.

In the optical amplifier in FIG. 5 configured in this manner, optical signals IN01 and IN20 of a 1.55-nm band output from the cores A01 and A02 of the multi-core optical fiber A are input to the cores B01 and B02 of the erbium-doped fiber B via a fan-out device and an optical isolator, which are not illustrated. The optical signals IN10 and IN20 are supplied, in the cores B01 and B02 of the erbium-doped fiber B, with pumping light power by a clad-collective pumping method from the pumping light source 50, thereby amplified, and output as amplified optical signals OUT10 and OUT20. At that time, the optical signals OUT10 and OUT20 are demultiplexed in the wavelength demultiplexers 21 and 22 into optical signals OUT11 and OUT21 of a short wavelength band having a high gain level and optical signals OUT13 and OUT23 of a long wavelength band having a low gain level. The optical signals OUT13 and OUT23 of a long wavelength band having a low gain level are supplied again, in the cores B03 and B04 of the erbium-doped optical fiber B, with pumping light power by a clad-collective pumping method from the pumping light source 50, and thereby amplified.

At that time, the optical signals OUT13 and OUT23 are supplied with pumping light power also from the core-individual-pumping light sources 83 and 84 in a form of backward pumping toward the cores B03 and B04 of the multi-core erbium-doped optical fiber B. In other words, at that time, the cores B03 and B04 of the multi-core erbium-doped optical fiber B are supplied with pumping light power by a core-individual pumping method from the core-individual-pumping light sources 83 and 84. The optical signals OUT13 and OUT23 are output as amplified optical signals OUT14 and OUT24. The optical signals OUT11 and OUT21 and the optical signals OUT14 and OUT24 are multiplexed by the wavelength multiplexers 31 and 32, respectively, and propagated as optical signals OUT15 and OUT 25, to cores C01 and C02 of the multi-core optical fiber C. At that time, parts of the optical signal OUT15 and OUT25 are branched in the optical branching devices 41 and 42, converted to electric signals by photoelectric conversion means illustration of which is omitted, and transmitted to the light-source-drive-circuit control devices 70 and 71 as output level information of signal light. At that time, the light-source-drive-circuit control devices 70 and 71 store an allowable threshold of a signal-light output level and executes the following control according to a situation.

(i) When a long wavelength band normally having a low gain level propagating through the cores B03 and B04 subjected to clad pumping twice is higher in gain level than a short wavelength band normally having a high gain level propagating through the cores B01 and B02 subjected to clad pumping only once, the light-source-drive-circuit control device 70 monitors WDM signals propagating through the cores B03 and B04. When a signal-light output level of a channel at a lowest gain level in a WDM band is higher than an allowable threshold, an instruction to weaken clad-collective pumping output is transmitted to the light-source drive circuit 60. When a signal-light output level of a channel at a lowest gain level in a WDM band is lower than an allowable threshold, an instruction to strengthen clad-collective pumping output is transmitted to the light-source drive circuit 60. At that time, WDM signal light propagating through the cores B01 and B02 has a gain level insufficient for an allowable threshold. Therefore, by driving the core-individual-pumping light sources 81 and 82, pumping light is introduced into the cores B01 and B02, and thereby the gain level is increased up to the allowable threshold. Specifically, WDM signals having propagated through the cores B01 and B02 and having been branched in the optical branching devices 45 and 47 are monitored by the light-source-drive-circuit control device 71, and when a signal-light output level of a channel at a lowest gain level in a WDM band is higher than an allowable threshold, an instruction to weaken core-individual pumping output is transmitted to the light-source drive circuit 61, and when a signal-light output level as described above is lower than an allowable threshold, an instruction to strengthen core-individual pumping output is transmitted to the light-source drive circuit 61.

(ii) When a long wavelength band normally having a low gain level propagating through the cores B03 and B04 subjected to clad pumping twice is lower in gain level than a short wavelength band normally having a high gain level propagating through the cores B01 and B02 subjected to clad pumping only once, the light-source-drive-circuit control device 70 monitors WDM signals propagating through the cores B01 and B02. When a signal-light output level of a channel at a lowest gain level in a WDM band is higher than an allowable threshold, an instruction to weaken clad-collective pumping output is transmitted to the light-source drive circuit 60. When a signal-light output level of a channel at a lowest gain level in a WDM band is lower than an allowable threshold, an instruction to strengthen clad-collective pumping output is transmitted to the light-source drive circuit 60. At that time, WDM signal light propagating through the cored B03 and B04 has a gain level insufficient for an allowable threshold. Therefore, by driving the core-individual-pumping light sources 83 and 84, pumping light is introduced into the cores B03 and B04, and thereby the gain level is increased up to the allowable threshold. Specifically, WDM signals propagating through the cores B03 and B04 are monitored by the light-source-drive-circuit control device 71, and when a signal-light output level of a channel at a lowest gain level in a WDM band is higher than an allowable threshold, an instruction to weaken core-individual pumping output is transmitted to the light-source drive circuit 61, and when a signal-light output level as described above is lower than an allowable threshold, an instruction to strengthen core-individual pumping output is transmitted to the light-source drive circuit 61.

Advantageous Effects of Example Embodiment

According to the optical amplifier in FIG. 5, similarly to the first example embodiment, optical signals OUT13 and OUT23 of a long wavelength band having a low gain level are supplied again, in the cores B03 and B04 of the multi-core erbium-doped optical fiber B, with pumping light power by a clad-collective pumping method from the pumping light source 50, thereby amplified, and additionally supplied with pumping energy, whereby a high gain can be acquired.

A fiber length through which light of a long wavelength band having a low gain level is propagated is effectively extended, and by using a multi-core erbium-doped fiber of which length is optimized for short wavelength-side amplification, the fiber length can be optimized for long wavelength-side amplification.

Also, according to the second example embodiment, a gain level of WDM signal light is equalized in a band, and thereby an attenuation request level can be decreased. As a result, electric-power utilization efficiency of an amplifier is increased, and thereby broadband and low-power consumption optical amplification is made possible.

According to the optical amplifier in FIG. 5, when a core pumping method of individually introducing pumping light into cores by using the core-individual-pumping light sources 81 to 84 is used together, a gain level of WDM signal light can be further equalized. When pumping energy is insufficient in clad-collective pumping based on introduction of pumping light of the pumping light source 50, pumping light of the core-individual-pumping light sources 81 to 84 is additionally introduced, as pumping energy, into cores of the multi-core erbium-doped optical fiber B in a form of core-individual pumping. Based on such individual introduction of pumping light into cores of the multi-core erbium-doped optical fiber B, a gain level of WDM signal light can be further equalized in a band, compared with the optical amplifier according to the first example embodiment.

As a result, according to the second example embodiment, an attenuation request level can be further decreased, compared with the first example embodiment.

Modified Example 1 of Second Example Embodiment

Figure 6:
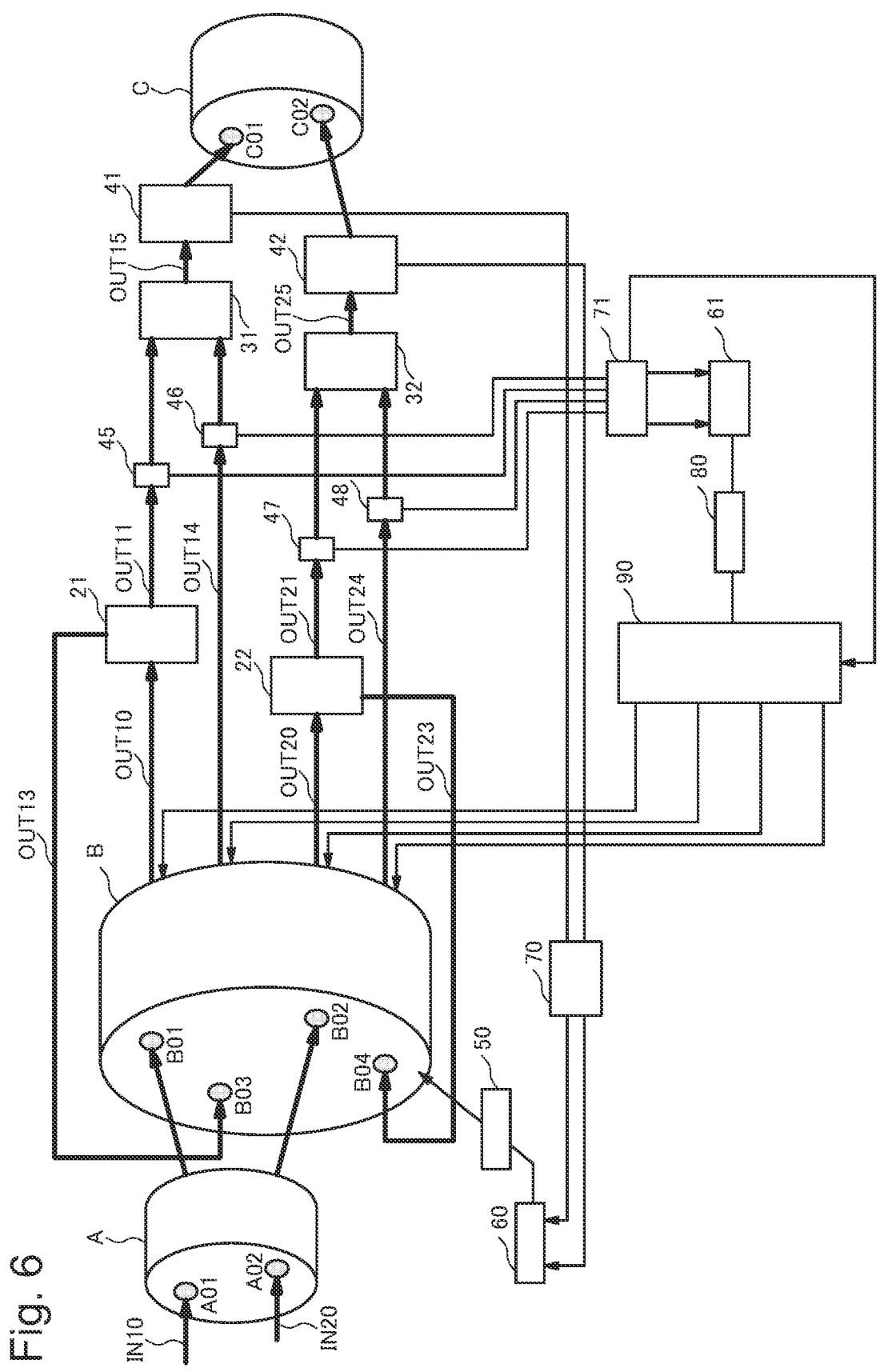
FIG. 6 is a block diagram illustrating a modified example 1 of the optical amplifier according to the second example embodiment.

Next, a modified example 1 of the optical amplifier according to the second example embodiment of the present invention is described. It is assumed that an element similar to an element of the above-described optical amplifiers in FIG. 2, FIG. 4, and FIG. 5 is assigned with the same reference number and detailed description thereof is omitted. FIG. 6 is a block diagram illustrating a configuration example of an optical amplifier according to a modified example 1 of the second example embodiment.

In the above-described optical amplifier in FIG. 5, core-individual-pumping light sources 81 to 84 of the same number as a core number of the multi-core erbium-doped optical fiber B are provided, and therefore when a core number of the multi-core erbium-doped optical fiber B is increased, the number of components is increased. Therefore, a configuration may be made in such a way that pumping light output from pumping light sources of a number less than a core number is shared by cores of the multi-core erbium-doped optical fiber B.

A means for sharing by cores is, for example, a variable optical multiplexer/demultiplexer. In this case, a configuration is made as in FIG. 6. A variable optical multiplexer/demultiplexer includes a function of receiving one pumping light source output and distributing the received output to a plurality of output ports and can change distribution to the plurality of output ports in accordance with a control signal to be received. It is conceivable that the variable optical multiplexer/demultiplexer is configured in such a way that, for example, pumping light from one pumping light source is used as input and a two-stage-configured tree-type 1×4 optical switch is included based on three one-input two-output gate optical switches. As each gate optical switch of a 1×4 optical switch, a gate optical switch that can operate not only as an ON/OFF switch but also as an analog switch capable of continuously adjusting light from transmission to interception in accordance with a control signal is known and can change distribution to four output ports in accordance with a control signal to be input. In an optical amplifier in FIG. 6, the core-individual-pumping light sources 81 to 84 in FIG. 5 are replaced with a pumping light source 80, an output of the pumping light source 80 is connected to an input of a variable optical multiplexer/demultiplexer 90, and output of the variable optical multiplexer/demultiplexer 90 is introduced into cores B01 to B04 of a multi-core erbium-doped optical fiber B in a form of core-individual pumping via an optical multiplexer. A light-source-drive-circuit control device 71 controls a light-source drive circuit 61 and in addition, controls output ports for the variable optical multiplexer/demultiplexer 90.

Specifically, when output from the pumping light source 80 is supplied to WDM signal light propagating through the cores B01 and B02 of the multi-core erbium-doped optical fiber B, output ports relevant to the cores B01 and B02 are released and controlled in such a way that a ratio between pumping light amounts required for WDM signal light propagating through the cores B01 and B02 is achieved. Herein, it is assumed that "an output port is released" indicates that pumping light output is distributed, i.e., is not caused to be zero. Output ports relevant to the cores B01 and B02 are released and pumping light output is distributed, and thereby controlled in such a way that a ratio between pumping light amounts required for WDM signal light propagating through the cores B01 and B02 is achieved. At the same time, the light-source-drive-circuit control device 71 issues, to the light-source drive circuit 61, an instruction by which a total value of pumping light amounts required for WDM signal light propagating through the cores B01 and B02 is achieved, and the pumping light source 80 having received a notification from the light-source drive circuit 61 outputs pumping light of the total amount.

When with regard to WDM signal light propagating through the cores B01 and B02 of the multi-core erbium-doped optical fiber B, a required ratio between pumping light amounts is 1/1, the variable optical multiplexer/demultiplexer 90 may be replaced with an optical switch. In this manner, according to the optical amplifier in FIG. 6, while the number of components is reduced, an advantageous effect similar to the optical amplifier according to the second example embodiment illustrated in FIG. 5 can be achieved.

It is also conceivable that, in the optical amplifier in FIG. 6, a combination such as pumping light of a pumping-light wavelength 1480-nm band is used as the pumping light source 50 and pumping light of a pumping-light wavelength 980-nm band is used as the pumping light source 80 is employed. It is also conceivable that, in the optical amplifier according to the present example embodiment, a combination such as pumping light of a pumping-light wavelength 980-nm band is used as the pumping light source 50 and pumping light of a pumping-light wavelength 1480-nm band is used as the pumping light source 80.

Modified Example 2 of Second Example Embodiment

Figure 7:
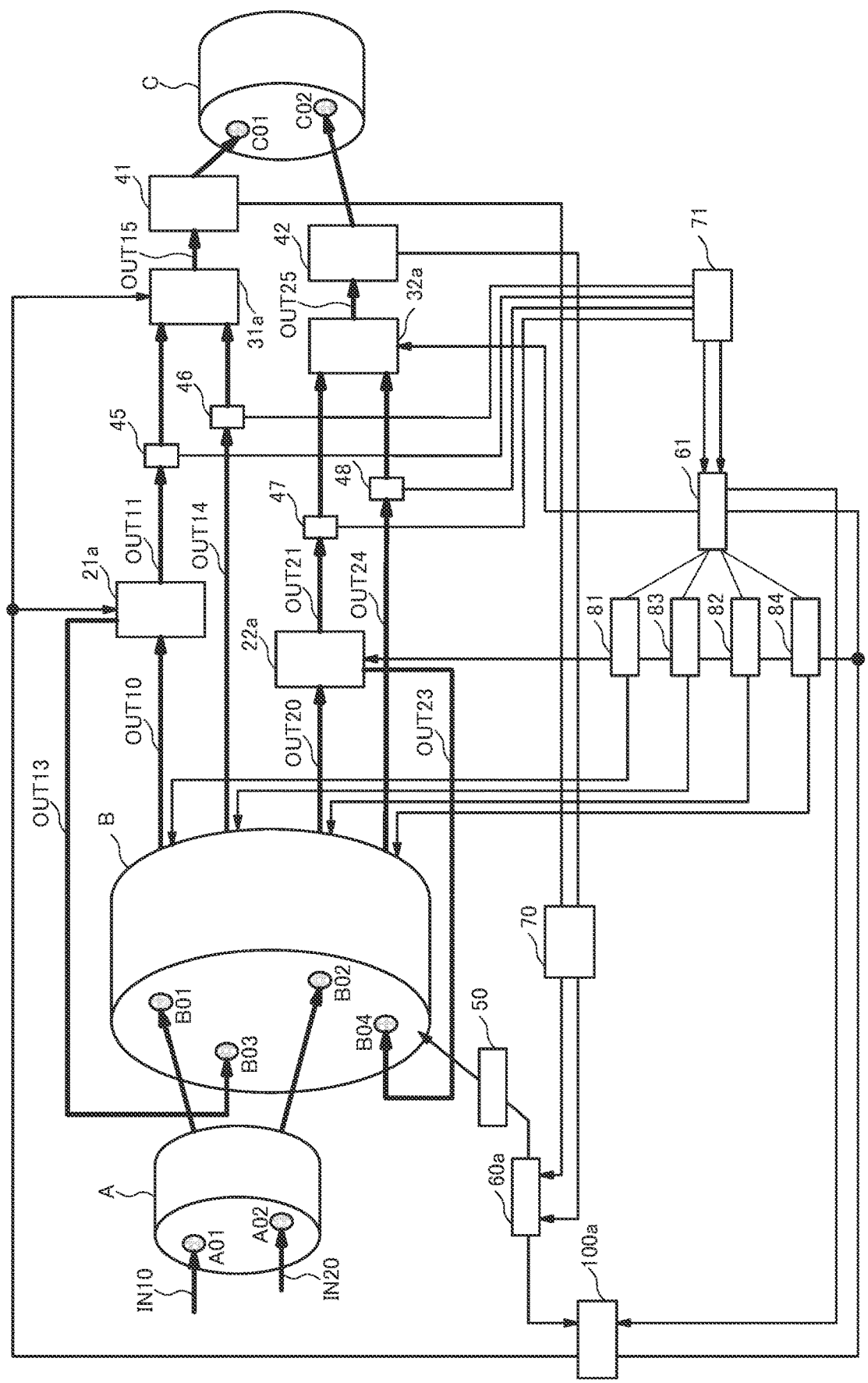
FIG. 7 is a block diagram illustrating a modified example 2 of the optical amplifier according to the second example embodiment.

Next, a modified example 2 of the optical amplifier according to the second example embodiment of the present invention is described. It is assumed that an element similar to an element of the above-described optical amplifiers in FIG. 2, FIG. 4, and FIG. 5 is assigned with the same reference number and detailed description thereof is omitted. FIG. 7 is a block diagram illustrating a configuration example of an optical amplifier according to a modified example 2 of the second example embodiment. The optical amplifier in FIG. 7 includes, in addition to the configuration in the optical amplifier according to the second example embodiment illustrated in FIG. 5, a power consumption monitor 100a.

In the optical amplifier in FIG. 7, the wavelength demultiplexers 21 and 22 and the wavelength multiplexers 31 and 32 of the optical amplifier in FIG. 5 are replaced with variable wavelength demultiplexers 21a and 22a and variable wavelength multiplexers 31a and 32a capable of modifying a ratio between a wavelength band having a high gain and a wavelength band having a low gain. Inputs of the power consumption monitor 100a are connected to outputs of a light-source drive circuit 60a and a light-source drive circuit 61, and outputs of the power consumption monitor 100a are connected to inputs of the variable wavelength demultiplexers 21a and 22a and the variable wavelength multiplexers 31a and 32a.

At that time, the power consumption monitor 100a monitors total power consumption based on power consumption in a pumping light source 50 and power consumption in core-individual-pumping light sources 81 to 84.

The power consumption monitor 100a issues, to the variable wavelength demultiplexers 21a and 22a and the variable wavelength multiplexers 31a and 32a, an instruction to adjust a ratio between a wavelength band having a high gain and a wavelength band having a low gain. More specifically, the power consumption monitor 100a issues, to the variable wavelength demultiplexers 21a and 22a and the variable wavelength multiplexers 31a and 32a, an instruction to adjust a ratio between a wavelength band having a high gain and a wavelength band having a low gain in such a way as to decrease, preferably minimize total power consumption in the pumping light source 50 and the core-individual-pumping light sources 81 to 84. In other words, the power consumption monitor 100a issues, to the variable wavelength demultiplexers 21a and 22a and the variable wavelength multiplexers 31a and 32a, an instruction to adjust a ratio between a wavelength band having a high gain and a wavelength band having a low gain in such a way as to decrease, preferably minimize a sum of power consumption of the pumping light source 50 and power consumption of the core-individual-pumping light sources 81 to 84. By receiving the instruction, the variable wavelength demultiplexers 21a and 22a and the variable wavelength multiplexers 31a and 32a modify a ratio between a wavelength band having a high gain and a wavelength band having a low gain.

The instruction, which is issued by the power consumption monitor 100a, to adjust a ratio between a wavelength band having a high gain and a wavelength band having a low gain is supplementarily described. Herein, a case in which WDM signal light propagating through a fiber having a core number of 1 is amplified by using an optical fiber amplifier having a core number of 2 is described as an example. First, based on an instruction of the power consumption monitor 100a, the variable wavelength demultiplexer 21a and the variable wavelength multiplexer 31a sequentially adjust an optical power ratio between a wavelength band having a high gain and a wavelength band having a low gain. Herein, an optical power ratio instructed to the variable wavelength multiplexer 31a and an optical power ratio instructed to the variable wavelength demultiplexer 21a are the same. At that time, a WDM signal is sequentially adjusted, for example, in such a way as to be demultiplexed at ratios being a wavelength band having a high gain/a wavelength band having a low gain=0/100→25/75→50/50→75/25→100/0. As a result, a ratio of clad pumping/core pumping of pumping light output necessary for acquiring a desired gain (a ratio between the excitation light source 50 and the core-individual-pumping light source 81+the core-individual-pumping light source 82) is changed, and therefore total power consumption in the pumping light source 50 and the core-individual-pumping light source 81+the core-individual-pumping light source 82 is changed. At that time, the power consumption monitor 100a monitors total power consumption, and the power consumption monitor 100a fixes a ratio when a value is minimized. By doing so, an optical power ratio between a wavelength band having a high gain and a wavelength band having a low gain can be adjusted for the variable wavelength demultiplexers 21a and 22a and the variable wavelength multiplexers 31a and 32a in such a way as to decrease, preferably minimize total power consumption in the pumping light source 50 and the core-individual-pumping light sources 81 to 84. It is assumed that the adjustment is executed for several seconds every time a wavelength filing rate is changed and an operated in such a way that power consumption of an amplifier is always minimum.

According to the optical amplifier in FIG. 7, similarly to the optical amplifier in FIG. 5, a gain level of WDM signal light is equalized in a band, and thereby an attenuation request level can be decreased. In the optical amplifier in FIG. 7, the variable wavelength demultiplexers 21a and 22a and the variable wavelength multiplexers 31a and 32a are instructed in such a way as to adjust a ratio between a wavelength band having a high gain and a wavelength band having a low gain, in consideration of total power consumption in the pumping light source 50 and the core-individual-pumping light sources 81 to 84 in such a way as to. Thereby, while power consumption is reduced, a gain level of WDM signal light is equalized in a band, and thereby an attenuation request level can be decreased. As a result, electric-power utilization efficiency of an amplifier is further increased, compared with the optical amplifier in FIG. 5, and thereby broadband and low-power consumption optical amplification is made possible.

Another Example Embodiment

While preferred example embodiments according to the present invention and modified examples of these example embodiments have been described, the present invention is not limited thereto. For example, in the above-described example embodiment, WDM signal light propagating through a multi-core fiber having a core number of N is amplified by using an optical fiber amplifier having a core number of M (N≥1, 2N≤M) is described assuming that N=2 and M=4, however, N=2, M=6, or the like may also be assumed.

Hereinafter, as an optical amplifier according to another example embodiment, one example in which WDM signal light propagating through a multi-core fiber having a core number of 3 is amplified by using an optical amplifier having a core number of 6 is described. An element similar to an element of the above-described optical amplifiers according to the first example embodiment and the second example embodiment is assigned with the same reference number and detailed description thereof is omitted.

Figure 8:
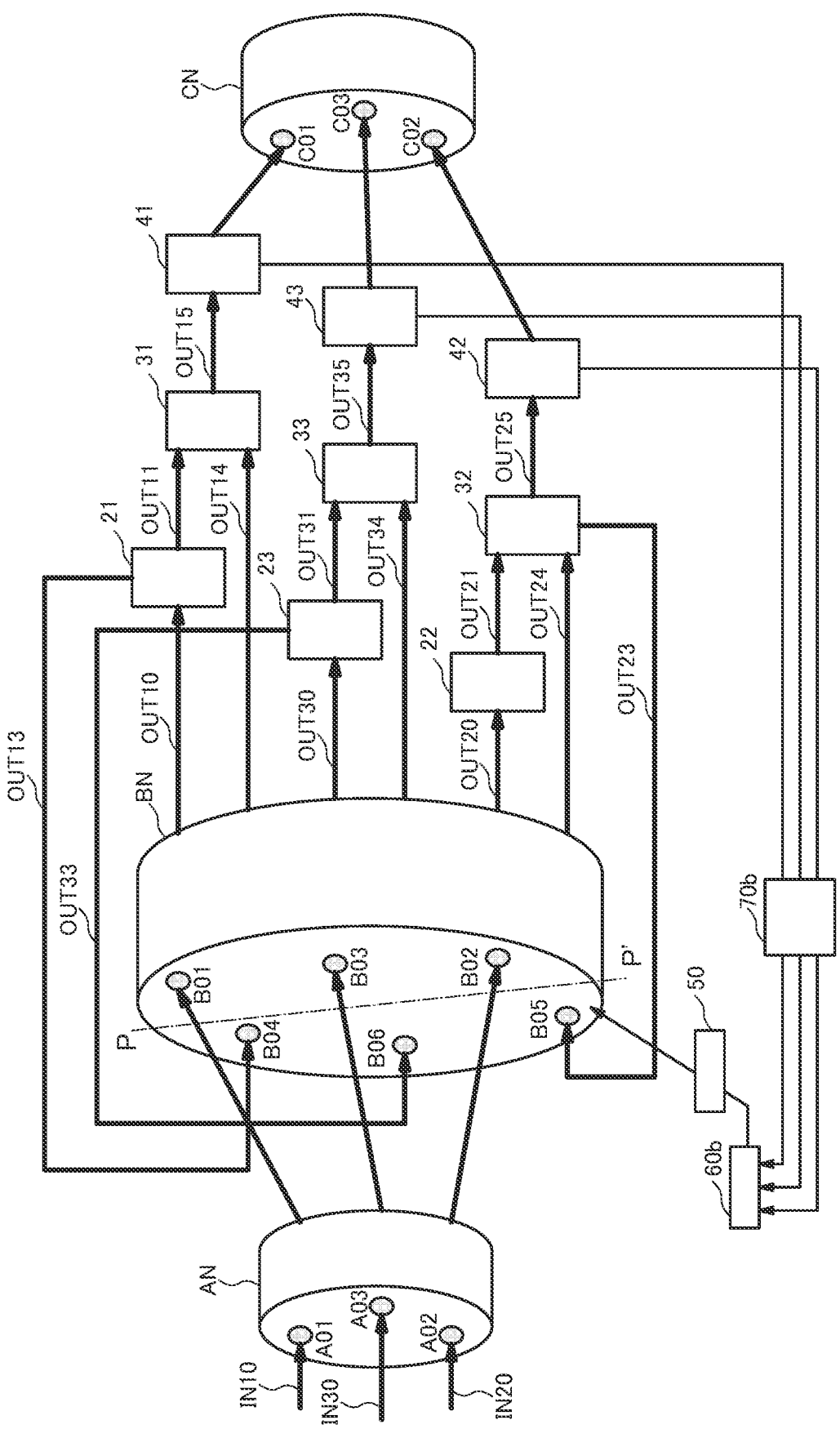
FIG. 8 is a block diagram illustrating an optical amplifier according to another example embodiment.

FIG. 8 is a block diagram illustrating a configuration example of an optical amplifier according to the another example embodiment. The optical amplifier in FIG. 8 includes a multi-core optical fiber AN, a multi-core erbium-doped optical fiber BN, and a multi-core optical fiber CN. The optical amplifier in FIG. 8 further includes wavelength demultiplexers 21, 22, and 23, wavelength multiplexers 31, 32, and 33, optical branching devices 41, 42, and 43, a pumping light source 50, a light-source drive circuit 60b, and a light-source-drive-circuit control device 70b.

The multi-core optical fiber AN propagates optical signals IN10, IN20, and IN30 to be input. The multi-core erbium-doped optical fiber BN is a multi-core optical fiber doped with erbium ions and amplifies an optical signal by being supplied with pumping light. Also, according to the present example embodiment, it is assumed that the multi-core erbium-doped optical fiber BN is optimized in length for short wavelength-side amplification. The multi-core optical fiber CN propagates optical signals OUT15, OUT25, and OUT 35 to be output. The wavelength demultiplexers 21, 22, and 23 demultiplex WDM signal light from the multi-core erbium-doped optical fiber B into a short wavelength side and a long wavelength side. The wavelength multiplexers 31, 32, and 33 multiplex a short wavelength side with a long wavelength side of WDM signal light. The optical branching devices 41, 42, and 43 separate a part of signal light from the wavelength multiplexers 31, 32, and 33. In other words, the optical branching devices 41, 42, and 43 each branch a part of WDM signal light (branch a part while including a signal of each wavelength band of WDM signal light). The pumping light source 50 is a light source for pumping light of a pumping-light wavelength 980-nm band or pumping light of a pumping-light wavelength 1480-nm band. The light-source drive circuit 60b drives the pumping light source 50. The light-source-drive-circuit control device 70b controls, based on output level information of signal light, the light-source drive circuit 60.

In the optical amplifier in FIG. 8, cores A01, A02, and A03 of the multi-core optical fiber AN are connected to cores B01, B02, and B03 of the multi-core erbium-doped optical fiber BN via a fan-out device and an optical isolator, which are not illustrated. Outputs of the cores B01, B02, and B03 of the multi-core erbium-doped optical fiber BN are connected to inputs of the wavelength demultiplexers 21, 22, and 23, respectively. Among outputs of the wavelength demultiplexers 21, 22, and 23, outputs of a long wavelength band having a low gain level in the multi-core erbium-doped fiber BN are connected to cores B04, B05, and B06 of the multi-core erbium-doped optical fiber BN, respectively.

Among outputs of the wavelength demultiplexers 21, 22, and 23, outputs of a short wavelength band having a high gain level in the multi-core erbium-doped fiber BN are connected to inputs of the wavelength multiplexers 31, 32, and 33, respectively. Outputs of the cores B04, B05, and B06 of the multi-core erbium-doped optical fiber BN are also connected to inputs of the wavelength multiplexers 31, 32, and 33.

Outputs of the wavelength multiplexers 31, 32, and 33 are connected to inputs of the optical branching devices 41, 42, and 43. The optical branching devices 41, 42, and 43 separate a part of signal light from the wavelength multiplexers 31, 32, and 33. In other words, the optical branching devices 41, 42, and 43 each branch a part of WDM signal light (branch a part while including a signal of each wavelength band of WDM signal light). Outputs of the optical branching devices 41, 42, and 43 are connected to cores C01, C02, and C03 of the multi-core optical fiber CN via a fan-in device and an optical isolator, which are not illustrated.

Outputs of the optical branching devices 41, 42, and 43 are connected to inputs of the light-source-drive-circuit control device 70b. An output of the light-source-drive-circuit control device 70b is connected to an input of the light-source drive circuit 60b. Output from the pumping light source 50 is supplied to a clad of the multi-core erbium-doped optical fiber BN via an optical multiplexer in a form of clad-collective pumping.

In the optical amplifier in FIG. 8 configured in this manner, optical signals IN10, IN20, and IN30 of a 1.55-μm band output from the cores A01, A02, and A03 of the multi-core optical fiber AN are input to the cores B01, B02, and B03 of the erbium-doped optical fiber BN via a fan-out device and an optical isolator. The optical signals IN10, IN20, and IN30 are supplied, in the cores B01, B02, B03 of the erbium-doped optical fiber BN, with pumping light power by a clad-collective pumping method from the pumping light source 50, thereby amplified, and output as amplified optical signals OUT10, OUT20, and OUT30. At that time, the optical signals OUT10, OUT20, and OUT30 are demultiplexed in the wavelength demultiplexers 21, 22, 23 into optical signals OUT11, OUT 21, and OUT 31 of a short wavelength band having a high gain level and optical signals OUT13, OUT23, and OUT33 of a long wavelength band having a low gain level.

The optical signals OUT13, OUT23, and OUT 33 of a long wavelength band having a low gain level are supplied again, in the cores B04, B05, and B06 of the multi-core erbium-doped optical fiber BN, with pumping light power by a clad-collective pumping method from the pumping light source 50, thereby amplified, and output as amplified optical signals OUT14, OUT24, and OUT34.

The optical signals OUT11, OUT21, and OUT31 and the optical signals OUT14, OUT24, and OUT34 are multiplexed by the wavelength multiplexers 31, 32, and 33, respectively, and propagated, as WDM signal light OUT15, OUT25, and OUT35, to the cores C01, C002, and C03 of the multi-core optical fiber CN.

At that time, parts of the optical signals OUT15, OUT25, and OUT35 are branched by the optical branching devices 41, 42, and 43, converted to electric signals by photoelectric conversion means illustration of which is omitted, and transmitted to the light-source-drive-circuit control device 70b as output level information of signal light. The light-source-drive-circuit control device 70b stores an allowable threshold of a signal-light output level and transmits, to the light-source drive circuit 60, an instruction to weaken clad-collective pumping output when a signal-light output level of a channel at a lowest gain level is higher than the allowable threshold and to strengthen clad-collective pumping output when a signal-light output level of a channel at a lowest gain level is lower than the allowable threshold in an entire band of WDM signal light OUT15, OUT25, and OUT35.

Advantageous Effects of Example Embodiment

According to the optical amplifier in FIG. 8, optical signals OUT13, OUT23, and OUT33 of a long wavelength band having a low gain level are supplied again, in the cores B04, B05, and B06 of the multi-core erbium-doped optical fiber BN, with pumping light power by a clad-collective pumping method from the pumping light source 50, thereby amplified, and additionally supplied with pumping energy, whereby a high gain can be acquired.

A fiber length through which light of a long wavelength band having a low gain level is propagated is effectively extended, and by using a multi-core erbium-doped fiber in which a length is optimized for short wavelength-side amplification, the fiber length can be optimized for long wavelength-side amplification.

Thereby, similarly to the first example embodiment or the like, a gain level of WDM signal light is equalized in a band, and thereby an attenuation request level can be lowered. As a result, electric-power utilization efficiency of an amplifier is increased, and thereby broadband and low-power consumption optical amplification is made possible.

Also according to the present example embodiment, used cores may be clearly divided for each gain level, as illustrated in FIG. 8, in such a way that a line segment P-P' in the multi-core erbium-doped optical fiber BN is set as a border, cores accommodating a wavelength band having a high gain are set as B01, B02, and B03, and cores accommodating a wavelength band having a low gain are set as B04, B05, and B06. In other words, also according to the present example embodiment, an optical amplifier according to the example embodiments can be configured in such a way that a gain level of signal light propagating through an inside is set as a determination criterion and a plurality of cores in a clad are divided into an area where a plurality of cores accommodating a wavelength band having a low gain are disposed and an area where a plurality of cores accommodating a wavelength band having a high gain are disposed.

Expansion and Further Modification of Example Embodiment

A multi-core optical fiber according to the above-described example embodiments can be formed as a non-coupling-type multi-core optical fiber or a coupling-type multi-core optical fiber. According to the above-described example embodiments, a multi-core erbium-doped optical fiber has been described as a multi-core optical fiber doped with a rare-earth element, but a rare-earth element to be doped is not limited to erbium. An optical fiber amplifier may be configured by using a multi-core optical fiber doped, according to a wavelength band of an amplification target, with praseodymium (Pr) or thulium (Tm) as one example of a rare-earth element.

It is conceivable that a configuration is made in such a way that the above-described optical amplifier in FIG. 6 includes a power consumption monitor that monitors total power consumption of power consumption in a pumping light source 50 and power consumption in a pumping light source 80, and in addition, a modification is made in which variable wavelength demultiplexers 21a and 22a and variable wavelength multiplexers 31a and 32a that can modify, similarly to the optical amplifier in FIG. 5, a ratio between a wavelength band having a high gain and a wavelength band having a low gain are used. In this case, an instruction to adjust a ratio between a wavelength band having a high gain and a wavelength band having a low gain in such a way as to decrease total power consumption based on power consumption in the pumping light source 50 and power consumption in the pumping light source 80 is issued to the variable wavelength demultiplexers 21a and 22a and the variable wavelength multiplexers 31a and 32a.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary note 1) An optical amplifier that amplifies wavelength multiplexed signal light, the optical amplifier including:

a multi-core optical fiber that includes a clad and a first core and a second core being disposed in the clad and is doped with rare-earth ions;

a pumping light source that supplies pumping light to the clad of the multi-core optical fiber; and a wavelength demultiplexing means that separates a wavelength band of the wavelength multiplexed signal light propagating through the first core, wherein signal light of a relatively long wavelength band among a plurality of wavelength bands separated by the wavelength demultiplexing means is caused to propagate through the second core and multiplexed with signal light of a relatively short wavelength band among the plurality of wavelength bands separated by the wavelength demultiplexing means and the resultant multiplexed signal light is output.

(Supplementary note 2) The optical amplifier according to supplementary note 1, further including a wavelength multiplexing means that causes signal light of a relatively long wavelength band among a plurality of wavelength bands separated by the wavelength demultiplexing means to propagate through the second core, multiplexes the propagated signal light with signal light of a relatively short wavelength band among the plurality of wavelength bands separated by the wavelength demultiplexing means, and outputs the resultant multiplexed signal light.

(Supplementary note 3) The optical amplifier according to supplementary note 1 or 2, causing signal light of a relatively long wavelength band among a plurality of wavelength bands separated by the wavelength demultiplexing means to propagate in the same direction as a propagation direction of the wavelength multiplexed signal light propagating through the first core.

(Supplementary note 4) The optical amplifier according to any one of supplementary notes 1 to 3, causing signal light of a relatively long wavelength band among a plurality of wavelength bands separated by the wavelength demultiplexing means to propagate through the second core, and controlling pumping output of the pumping light source according to an output level of wavelength multiplexed signal light acquired by multiplexing the propagated signal light with signal light of a relatively short wavelength band among the plurality of wavelength bands separated by the wavelength demultiplexing means.

(Supplementary note 5) The optical amplifier according to any one of supplementary notes 1 to 3, further including
  an individual pumping light source that individually supplies pumping light to the first core and the second core of the multi-core optical fiber, wherein
  pumping output of the individual pumping light source is controlled according to an output level of signal light of a relatively long wavelength band after the signal light of the relatively long wavelength band among a plurality of wavelength bands separated by the wavelength demultiplexing means is propagated through the second core and an output level of signal light of a relatively short wavelength band among the plurality of wavelength bands separated by the wavelength demultiplexing means.

(Supplementary note 6) The optical amplifier according to supplementary note 5, wherein the individual pumping light source separately includes a light source that supplies pumping light to the first core and a light source that supplies pumping light to the second core.

(Supplementary note 7) The optical amplifier according to supplementary note 5, wherein the individual pumping light source includes pumping light sources of a number less than the number of the first cores and the second cores, and each of the pumping light sources supplies pumping light to the first core or the second core according to a control signal.

(Supplementary note 8) The optical amplifier according to supplementary note 7, further including a control means that outputs, to the individual pumping light source, the control signal for determining a supply destination of pumping light.

(Supplementary note 9) The optical amplifier according to any one of supplementary notes 5 to 8, wherein pumping light from the individual pumping light source to the first core or the second core is supplied from a direction opposite to a propagation direction of the wavelength multiplexed signal light propagating through the first core.

(Supplementary note 10) The optical amplifier according to any one of supplementary notes 5 to 9, wherein, when pumping light of a pumping-light wavelength 1480-nm band is used for the pumping light source that supplies pumping light to the clad of the multi-core optical fiber, pumping light of a pumping-light wavelength 980-nm band is used for the individual pumping light source, or when pumping light of a pumping-light wavelength 980-nm band is used for the pumping light source that supplies pumping light to the clad of the multi-core optical fiber, pumping light of a pumping-light wavelength 1480-nm band is used for the individual pumping light source.

(Supplementary note 11) The optical amplifier according to any one of supplementary notes 1 to 10, wherein
  the wavelength demultiplexing means is a variable wavelength demultiplexing means that is able to modify a ratio between a wavelength band having a high gain and a wavelength band having a low gain, the optical amplifier further including
  a power consumption monitor means that monitors power consumption of the pumping light source, and instructs the variable wavelength demultiplexing means to modify a ratio between a wavelength band having a high gain and a wavelength band having a low gain.

(Supplementary note 12) The optical amplifier according to any one of supplementary notes 5 to 10, wherein
  the wavelength demultiplexing means is a variable wavelength demultiplexing means that is able to modify a ratio between a wavelength band having a high gain and a wavelength band having a low gain, the optical amplifier further including
  a power consumption monitor means that monitors power consumption of the pumping light source and power consumption of the individual pumping light source, and instructs the variable wavelength demultiplexing means to modify a ratio between a wavelength band having a high gain and a wavelength band having a low gain.

(Supplementary note 13) The optical amplifier according to supplementary note 2, wherein
  the wavelength demultiplexing means is a variable wavelength demultiplexing means that is able to modify a ratio between a wavelength band having a high gain and a wavelength band having a low gain, and
  the wavelength multiplexing means is a variable wavelength multiplexing means that is able to modify a ratio between a wavelength band having a high gain and a wavelength band having a low gain, the optical amplifier further including
  a power consumption monitor means that monitors power consumption of the pumping light source and instructs the variable wavelength demultiplexing means and the wavelength multiplexing means to modify a ratio between a wavelength band having a high gain and a wavelength band having a low gain.

(Supplementary note 14) The optical amplifier according to supplementary note 5, wherein
  the wavelength demultiplexing means is a variable wavelength demultiplexing means that is able to modify a ratio between a wavelength band having a high gain and a wavelength band having a low gain, and the wavelength multiplexing means is a variable wavelength multiplexing means that is able to modify a ratio between a wavelength band having a high gain and a wavelength band having a low gain, the optical amplifier further including a power consumption monitor means that monitors power consumption of the pumping light source and power consumption of the individual pumping light source, and instructs the variable wavelength demultiplexing means and the wavelength multiplexing means to modify a ratio between a wavelength band having a high gain and a wavelength band having a low gain.

(Supplementary note 15) The optical amplifier according to any one of supplementary notes 1 to 14, wherein the multi-core optical fiber has a fiber length optimized for a signal gain level of a short wavelength side of wavelength multiplexed signal light to be amplified.

(Supplementary note 16) The optical amplifier according to any one of supplementary notes 1 to 15, wherein, in the multi-core optical fiber, an area where a core accommodating a wavelength band having a high gain level is disposed and an area where a core accommodating a wavelength band having a low gain level is disposed are divided.

(Supplementary note 17) The optical amplifier according to any one of supplementary notes 1 to 16, wherein, in the multi-core optical fiber, a wavelength band having a high gain level is accommodated in a core of which gain of clad pumping by supplying pumping light from the pumping light source to the clad is low, and a wavelength band having a low gain level is accommodated in a core of which gain is high.

(Supplementary note 18) The optical amplifier according to any one of supplementary notes 1 to 17, wherein the multi-core optical fiber is a non-coupling-type multi-core fiber or a coupling-type multi-core fiber.

(Supplementary note 19) A transmission system including: an optical fiber; and the optical amplifier according to any one of supplementary notes 1 to s18, the optical amplifier being an optical amplifier connected to the optical fiber.

(Supplementary note 20) An equalizing method for an optical amplifier that amplifies wavelength multiplexed signal light, wherein the optical amplifier includes a multi-core optical fiber that includes a clad and a first core and a second core being disposed in the clad and is doped with rare-earth ions, a pumping light source that supplies pumping light to the clad of the multi-core optical fiber, and a wavelength demultiplexing means that separates a wavelength band of the wavelength multiplexed signal light propagating through the first core, the method including:

causing signal light of a relatively long wavelength band among a plurality of wavelength bands separated by the wavelength demultiplexing means to propagate through the second core; multiplexing the propagated signal light with signal light of a relatively short wavelength band among the plurality of wavelength bands separated by the wavelength demultiplexing means; and outputting the resultant multiplexed signal light.

(Supplementary note 21) The equalizing method for an optical amplifier according to supplementary note 20, wherein the optical amplifier further includes a wavelength multiplexing means that causes signal light of a relatively long wavelength band among a plurality of wavelength bands separated by the wavelength demultiplexing means to propagate through the second core, multiplexes the propagated signal light with signal light of a relatively short wavelength band among the plurality of wavelength bands separated by the wavelength demultiplexing means, and outputs the resultant multiplexed signal light.

(Supplementary note 22) The equalizing method for an optical amplifier according to supplementary note 20 or 21, the method further including causing signal light of a relatively long wavelength band among the plurality of wavelength bands separated by the wavelength demultiplexing means to propagate in the same direction as a propagation direction of the wavelength multiplexed signal light propagating through the first core.

(Supplementary note 23) The equalizing method for an optical amplifier according to any one of supplementary notes 20 to 22, the method further including: causing signal light of a relatively long wavelength band among a plurality of wavelength bands separated by the wavelength demultiplexing means to propagate through the second core; and controlling pumping output of the pumping light source according to an output level of wavelength multiplexed signal light acquired by multiplexing the propagated signal light with signal light of a relatively short wavelength band among the plurality of wavelength bands separated by the wavelength demultiplexing means.

(Supplementary note 24) The equalizing method for an optical amplifier according to any one of supplementary notes 20 to 23, wherein the optical amplifier further includes an individual pumping light source that individually supplies pumping light to the first core and the second core of the multi-core optical fiber, the method further including controlling pumping output of the individual pumping light source according to an output level of signal light of a relatively long wavelength band after signal light of the relatively long wavelength band among a plurality of wavelength bands separated by the wavelength demultiplexing means is propagated through the second core and an output level of signal light of a relatively short wavelength band among the plurality of wavelength bands separated by the wavelength demultiplexing means.

(Supplementary note 25) The equalizing method for an optical amplifier according to supplementary note 24, wherein the individual pumping light source separately includes a light source that supplies pumping light to the first core and a light source that supplies pumping light to the second core.

(Supplementary note 26) The equalizing method for an optical amplifier according to supplementary note 24, wherein the individual pumping light source includes pumping light sources of a number less than the number of the first cores and the second cores, and the pumping light source supplies pumping light to the first core or the second core according to a control signal.

(Supplementary note 27) The equalizing method for an optical amplifier according to any one of supplementary notes 24 to 26, the method further including supplying pumping light from the individual pumping light source to the first core or the second core, from a direction opposite to a propagation direction of the wavelength multiplexed signal light propagating through the first core.

(Supplementary note 28) The equalizing method for an optical amplifier according to any one of supplementary notes 20 to 27, wherein
the wavelength demultiplexing means is a variable wavelength demultiplexing means that is able to modify a ratio between a wavelength band having a high gain and a wavelength band having a low gain, the method further including:
monitoring power consumption of the pumping light source; and instructing the variable wavelength demultiplexing means to modify a ratio between a wavelength band having a high gain and a wavelength band having a low gain.

(Supplementary note 29) The equalizing method for an optical amplifier according to any one of supplementary notes 24 to 27, wherein
the wavelength demultiplexing means is a variable wavelength demultiplexing means that is able to modify a ratio between a wavelength band having a high gain and a wavelength band having a low gain, the method further including:
monitoring power consumption of the pumping light source and power consumption of the individual pumping light source; and instructing the variable wavelength demultiplexing means to modify a ratio between a wavelength band having a high gain and a wavelength band having a low gain.

(Supplementary note 30) The equalizing method for an optical amplifier according to supplementary note 21, wherein
the wavelength demultiplexing means is a variable wavelength demultiplexing means that is able to modify a ratio between a wavelength band having a high gain and a wavelength band having a low gain, and
the wavelength multiplexing means is a variable wavelength multiplexing means that is able to modify a ratio between a wavelength band having a high gain and a wavelength band having a low gain, the method further including
monitoring power consumption of the pumping light source; and instructing the variable wavelength demultiplexing means and the wavelength multiplexing means to modify a ratio between a wavelength band having a high gain and a wavelength band having a low gain.

(Supplementary note 31) The equalizing method for an optical amplifier according to supplementary note 24, note 1 wherein
the wavelength demultiplexing means is a variable wavelength demultiplexing means that is able to modify a ratio between a wavelength band having a high gain and a wavelength band having a low gain,
the wavelength multiplexing means is a variable wavelength multiplexing means that is able to modify a ratio between a wavelength band having a high gain and a wavelength band having a low gain, and
the optical amplifier further includes a power consumption monitor means that monitors power consumption of the pumping light source and power consumption of the individual pumping light source, and instructs the variable wavelength demultiplexing means and the wavelength multiplexing means to modify a ratio between a wavelength band having a high gain and a wavelength band having a low gain.

(Supplementary note 32) The equalizing method for an optical amplifier according to any one of supplementary notes 20 to 31, wherein the multi-core optical fiber has a fiber length optimized for a signal gain level of a short wavelength side of wavelength multiplexed signal light to be amplified.

(Supplementary note 33) The equalizing method for an optical amplifier according to any one of supplementary notes 20 to 32, wherein, in the multi-core optical fiber, an area where a core accommodating a wavelength band having a high gain level is disposed and an area where a core accommodating a wavelength band having a low gain level is disposed are divided.

(Supplementary note 34) The equalizing method for an optical amplifier according to any one of supplementary notes 20 to 33, wherein, in the multi-core optical fiber, a wavelength band having a high gain level is accommodated in a core of which gain of clad pumping by supplying pumping light from the pumping light source to the clad is low, and a wavelength band having a low gain level is accommodated in a core of which gain is high.

This application is based upon and claims the benefit of priority from Japanese patent application No. 2018-243894, filed on Dec. 27, 2018, the disclosure of which is incorporated herein in its entirety by reference.

REFERENCE SIGNS LIST 21, 22, 23 Wavelength demultiplexer
21a, 22a Variable wavelength demultiplexer
31, 32, 33 Wavelength multiplexer
31a, 32a Variable wavelength multiplexer
41, 42, 43 Optical branching device
50 Pumping light source
60, 60a, 60b, 61 Light-source drive circuit
70, 70b, 71 Light-source-drive-circuit control device
80 Pumping light source
81, 82, 83, 84 Core-individual-pumping light source
90 Variable optical multiplexer/demultiplexer
100 Power consumption monitor

What is claimed is:
1. An optical amplifier that amplifies wavelength multiplexed signal light, the optical amplifier comprising:
a multi-core optical fiber that includes a clad, and a first core and a second core being disposed in the clad and is doped with rare-earth ions;
a pumping light source that supplies pumping light to the clad of the multi-core optical fiber; and
a wavelength demultiplexing unit that separates a plurality of wavelength bands of the wavelength multiplexed signal light propagating through the first core, wherein
signal light of a relatively long wavelength band among the plurality of wavelength bands separated by the wavelength demultiplexing unit is caused to propagate through the second core and multiplexed with signal light of a relatively short wavelength band among the plurality of wavelength bands separated by the wavelength demultiplexing unit, and the resultant multiplexed signal light is output.

2. The optical amplifier according to claim 1, further comprising
a wavelength multiplexing unit that causes the signal light of the relatively long wavelength band among the plurality of wavelength bands separated by the wavelength demultiplexing unit to propagate through the second core, multiplexing the propagated signal light with the signal light of the relatively short wavelength band among the plurality of wavelength bands separated by the wavelength demultiplexing unit, and outputting the resultant multiplexed signal light.

3. The optical amplifier according to claim 1,
causing the signal light of the relatively long wavelength band among the plurality of wavelength bands separated by the wavelength demultiplexing unit to propagate in a same direction as a propagation direction of the wavelength multiplexed signal light propagating through the first core.

4. The optical amplifier according to claim 1,
causing signal light of the relatively long wavelength band among the plurality of wavelength bands separated by the wavelength demultiplexing unit to propagate through the second core, and controlling pumping output of the pumping light source according to an output level of wavelength multiplexed signal light acquired by multiplexing the propagated signal light with signal light of the relatively short wavelength band among the plurality of wavelength bands separated by the wavelength demultiplexing unit.

5. The optical amplifier according to claim 1, further comprising
an individual pumping light source that individually supplies pumping light to the first core and the second core of the multi-core optical fiber, wherein
pumping output of the individual pumping light source is controlled according to an output level of signal light of the relatively long wavelength band after the signal light of the relatively long wavelength band among a plurality of wavelength bands separated by the wavelength demultiplexing unit is propagated through the second core and an output level of the signal light of the relatively short wavelength band among the plurality of wavelength bands separated by the wavelength demultiplexing unit.

6. The optical amplifier according to claim 5, wherein
the individual pumping light source separately includes a light source that supplies pumping light to the first core and a light source that supplies pumping light to the second core.

7. The optical amplifier according to claim 5, wherein
the individual pumping light source includes pumping light sources of a number less than a number of the first cores and the second cores, and each of the pumping light sources supplies pumping light to the first core or the second core according to a control signal.

8. The optical amplifier according to claim 7, further comprising
a control unit that outputs, to the individual pumping light source, the control signal for determining a supply destination of pumping light.

9. The optical amplifier according to claim 5, wherein
pumping light from the individual pumping light source to the first core or the second core is supplied from a direction opposite to a propagation direction of the wavelength multiplexed signal light propagating through the first core.

10. The optical amplifier according to claim 5 wherein,
when pumping light of a pumping-light wavelength 1480-nm band is used for the pumping light source that supplies pumping light to the clad of the multi-core optical fiber, pumping light of a pumping-light wavelength 980-nm band is used for the individual pumping light source, or when pumping light of a pumping-light wavelength 980-nm band is used for the pumping light source that supplies pumping light to the clad of the multi-core optical fiber, pumping light of a pumping-light wavelength 1480-nm band is used for the individual pumping light source.

11. The optical amplifier according to claim 1, wherein
the wavelength demultiplexing unit is a variable wavelength demultiplexing unit being able to modify a ratio between a wavelength band having a high gain and a wavelength band having a low gain, the optical amplifier further comprising
a power consumption monitor unit that monitors power consumption of the pumping light source and instructing the variable wavelength demultiplexing unit to modify the ratio between the wavelength band having the high gain and wavelength band having the low gain.

12. The optical amplifier according to claim 5, wherein
the wavelength demultiplexing unit is a variable wavelength demultiplexing unit being able to modify a ratio between a wavelength band having a high gain and a wavelength band having a low gain, the optical amplifier further comprising
a power consumption monitor unit that monitors power consumption of the pumping light source and power consumption of the individual pumping light source, and instructing the variable wavelength demultiplexing unit to modify the ratio between the wavelength band having the high gain and the wavelength band having the low gain.

13. The optical amplifier according to claim 2, wherein
the wavelength demultiplexing unit is a variable wavelength demultiplexing unit being able to modify a ratio between a wavelength band having a high gain and a wavelength band having a low gain, and
the wavelength multiplexing unit is variable wavelength multiplexing unit being able to modify the ratio between the wavelength band having the high gain and the wavelength band having the low gain, the optical amplifier further comprising
a power consumption monitor unit that monitors power consumption of the pumping light source, and instructing the variable wavelength demultiplexing unit and the wavelength multiplexing unit to modify the ratio between the wavelength band having the high gain and the wavelength band having the low gain.

14. The optical amplifier according to claim 5, wherein
the wavelength demultiplexing unit is a variable wavelength demultiplexing unit being able to modify a ratio between a wavelength band having a high gain and a wavelength band having a low gain, and
the wavelength multiplexing unit is a variable wavelength multiplexing unit being able to modify the ratio between the wavelength band having the high gain and the wavelength band having the low gain, the optical amplifier further comprising
a power consumption monitor unit that monitors power consumption of the pumping light source and power consumption of the individual pumping light source, and instructing the variable wavelength demultiplexing unit and the wavelength multiplexing unit to modify the ratio between the wavelength band having the high gain and the wavelength band having the low gain.

15. The optical amplifier according to claim 1, wherein
the multi-core optical fiber has a fiber length optimized for a signal gain level of a short wavelength side of the wavelength multiplexed signal light to be amplified.

16. The optical amplifier according to claim 1, wherein, in the multi-core optical fiber, an area where a core accommodating a wavelength band where a gain level of the optical amplifier is relatively high is disposed and an area where a core accommodating a wavelength band where a gain level of the optical amplifier is relatively low is disposed are divided.

17. The optical amplifier according to claim 1, wherein, in the multi-core optical fiber, a wavelength band where a gain level of the optical amplifier is relatively high is accommodated in a core of which gain of clad pumping by supplying pumping light from the pumping light source to the clad is low, and a wavelength band where a gain level of the optical amplifier is relatively low is accommodated in a core of which gain is high.

18. The optical amplifier according to claim 1, wherein the multi-core optical fiber is an uncoupled-core multi-core fiber or a coupled-core multi-core fiber.

19. A transmission system comprising:
an optical fiber; and the optical amplifier according to claim 1, the optical amplifier being an optical amplifier connected to the optical fiber.

20. An equalizing method for an optical amplifier that amplifies wavelength multiplexed signal light, wherein the optical amplifier includes a multi-core optical fiber that includes a clad, and a first core and a second core being disposed in the clad, and is doped with rare-earth ions, a pumping light source that supplies pumping light to the clad of the multi-core optical fiber, and a wavelength demultiplexing unit that separates a wavelength band of the wavelength multiplexed signal light propagating through the first core, the method comprising:

causing signal light of a relatively long wavelength band among a plurality of wavelength bands separated by the wavelength demultiplexing unit to propagate through the second core; multiplexing the propagated signal light with signal light of a relatively short wavelength band among the plurality of wavelength bands separated by the wavelength demultiplexing unit; and outputting the resultant multiplexed signal light.

* * * * *